United States Patent
Dasgupta et al.

(10) Patent No.: US 11,714,070 B2
(45) Date of Patent: *Aug. 1, 2023

(54) PERMEATIVE AMINE OR ACID INTRODUCTION FOR VERY WEAK ACID DETECTION IN ION CHROMATOGRAPHY

(71) Applicant: BOARD OF REGENTS, THE UNIVERSITY OF TEXAS SYSTEM, Austin, TX (US)

(72) Inventors: Purnendu K. Dasgupta, Arlington, TX (US); Charles Philip Shelor, Arlington, TX (US); Hongzhu Liao, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 283 days.

This patent is subject to a terminal disclaimer.

(21) Appl. No.: 16/891,901

(22) Filed: Jun. 3, 2020

(65) Prior Publication Data
US 2020/0292511 A1  Sep. 17, 2020

Related U.S. Application Data

(63) Continuation of application No. 15/377,833, filed on Dec. 13, 2016, now Pat. No. 11,287,403.
(Continued)

(51) Int. Cl.
*G01N 30/96* (2006.01)
*G01N 27/44* (2006.01)
(Continued)

(52) U.S. Cl.
CPC ............. *G01N 30/96* (2013.01); *B01D 15/24* (2013.01); *B01D 15/363* (2013.01);
(Continued)

(58) Field of Classification Search
CPC ....... G01N 30/96; G01N 27/447; B01D 15/36
(Continued)

(56) References Cited

U.S. PATENT DOCUMENTS 3,926,561 A * 12/1975 Lucero .................. B01D 53/22
                                                    436/139
3,947,351 A    3/1976 Asawa et al.
(Continued)

FOREIGN PATENT DOCUMENTS

DE         10163083       7/2003
WO    WO 1996/027793 A1  9/1996

OTHER PUBLICATIONS

Goodfellow, G. I. et al, Analyst 1976, 101, 848-855.*
(Continued)

*Primary Examiner* — Arlen Soderquist
(74) *Attorney, Agent, or Firm* — Frost Brown Todd LLP

(57) ABSTRACT

A permeative amine/acid introduction device (PAID) is placed after a conventional KOH eluent suppressed conductometric anion chromatography (SCAC) system. The PAID converts the suppressed eluites from the acid form to the corresponding salt. For example, when the analytes are acids, they are converted to the corresponding ammonium salt ($NR_2H+HX \rightarrow NR_2H_2^+ + X^-$) and allows very weak acids HX ($pK_a \geq 7.0$) that cannot normally be detected by SCAC to be measured by a second conductivity detector following the PAID. Permeative reagent introduction is dilutionless, can be operated without pumps and provides good mixing with low band dispersion (as small as 30 μL). An exemplary amine is diethylamine (DEA), which was chosen as the amine source due to its low $pK_b$ value ($pK_b$ 3.0), high vapor pressure, and low toxicity and low odor.

6 Claims, 30 Drawing Sheets

Related U.S. Application Data

(60) Provisional application No. 62/276,154, filed on Jan. 7, 2016.

(51) Int. Cl.
*B01D 15/24* (2006.01)
*B01D 15/36* (2006.01)
*G01N 27/447* (2006.01)

(52) U.S. Cl.
CPC ..... *G01N 27/44756* (2013.01); *B01D 15/367* (2013.01); *G01N 2030/965* (2013.01)

(58) Field of Classification Search
USPC .......... 436/100, 109, 121, 131, 161; 422/70, 422/82.01, 82.02
See application file for complete search history.

(56) References Cited

U.S. PATENT DOCUMENTS

| | | | |
|---|---|---|---|
| 3,986,950 A | 10/1976 | Orofino | |
| 4,131,428 A | 12/1978 | Diggens | |
| 4,242,097 A | 12/1980 | Johnson et al. | |
| 4,251,218 A | 2/1981 | Diggens | |
| 4,257,257 A * | 3/1981 | Dairaku | G01N 33/1826 96/6 |
| 4,268,279 A | 5/1981 | Shindo et al. | |
| 4,314,823 A | 2/1982 | Rich, Jr. et al. | |
| 4,403,039 A | 9/1983 | Ban et al. | |
| 4,448,691 A | 5/1984 | Davis | |
| 4,451,374 A | 5/1984 | Peterson et al. | |
| 4,455,233 A | 6/1984 | Pohl et al. | |
| 4,474,664 A | 10/1984 | Stevens et al. | |
| 4,529,521 A * | 7/1985 | Cortes | G01N 30/06 210/635 |
| 4,532,347 A | 7/1985 | Vaughan | |
| 4,533,518 A | 8/1985 | Hanaoka et al. | |
| 4,549,965 A * | 10/1985 | Davis | B01J 4/001 436/161 |
| 4,647,380 A | 3/1987 | Dasgupta | |
| 4,672,042 A | 6/1987 | Ross, Jr. et al. | |
| 4,699,718 A | 10/1987 | Jones et al. | |
| 4,715,217 A * | 12/1987 | Coyne | B01D 61/18 73/19.1 |
| 4,726,930 A | 2/1988 | Matsushita et al. | |
| 4,751,004 A | 6/1988 | Stevens et al. | |
| 4,794,088 A | 12/1988 | Miyaki et al. | |
| 4,837,161 A * | 6/1989 | Stevens | G01N 30/84 210/321.82 |
| 4,849,110 A | 7/1989 | Takata et al. | |
| 4,952,126 A | 8/1990 | Hanaoka et al. | |
| 4,963,264 A | 10/1990 | Davis | |
| 5,037,554 A | 8/1991 | Nomi | |
| 5,045,204 A | 9/1991 | Dasgupta et al. | |
| 5,068,090 A | 11/1991 | Connolly | |
| 5,132,094 A | 7/1992 | Godec et al. | |
| 5,149,661 A | 9/1992 | Gjerde et al. | |
| 5,171,694 A | 12/1992 | Connolly | |
| 5,208,165 A | 5/1993 | Law et al. | |
| 5,234,586 A | 8/1993 | Afeyan et al. | |
| 5,252,491 A | 10/1993 | Connolly | |
| 5,358,612 A | 10/1994 | Dasgupta et al. | |
| 5,433,838 A | 7/1995 | Dasgupta et al. | |
| 5,443,991 A | 8/1995 | Godec et al. | |
| 5,578,204 A * | 11/1996 | Bartholmes | G01N 30/96 210/321.89 |
| 5,585,004 A * | 12/1996 | Livingston | B01D 63/02 210/500.21 |
| 5,597,734 A | 1/1997 | Small et al. | |
| 5,633,171 A | 5/1997 | Small et al. | |
| 5,668,014 A | 9/1997 | Aoki et al. | |
| 5,773,615 A | 6/1998 | Small et al. | |
| 5,882,937 A | 3/1999 | Sauer et al. | |
| 6,093,327 A | 7/2000 | Anderson, Jr. et al. | |
| 6,217,634 B1 * | 4/2001 | Dominelli | B01D 19/0031 96/6 |
| 6,271,023 B1 * | 8/2001 | Baurmeister | B01D 63/026 210/321.64 |
| 6,325,976 B1 | 12/2001 | Small et al. | |
| 6,328,885 B1 | 12/2001 | Srinivasan et al. | |
| 6,444,475 B1 | 9/2002 | Anderson, Jr. et al. | |
| 6,468,804 B1 | 10/2002 | Anderson, Jr. et al. | |
| 6,562,628 B1 | 5/2003 | Liu et al. | |
| 6,610,546 B1 | 8/2003 | Liu et al. | |
| 6,752,927 B2 | 6/2004 | Srinivasan et al. | |
| 7,306,720 B2 | 12/2007 | Dasgupta et al. | |
| 7,329,346 B2 | 2/2008 | Liu et al. | |
| 7,582,482 B2 | 9/2009 | Dasgupta et al. | |
| 7,618,535 B2 | 11/2009 | Srinivasan et al. | |
| 7,618,826 B2 | 11/2009 | Liu et al. | |
| 7,682,506 B2 | 3/2010 | Srinivasan et al. | |
| 7,892,848 B2 | 2/2011 | Riviello | |
| 7,964,411 B2 | 6/2011 | Dasgupta et al. | |
| 7,981,284 B2 | 7/2011 | Sakamoto et al. | |
| 8,101,422 B2 | 1/2012 | Srinivasan et al. | |
| 8,216,515 B2 | 7/2012 | Liu et al. | |
| 8,425,842 B2 | 4/2013 | Horiike | |
| 8,449,658 B2 | 5/2013 | McAdams et al. | |
| 8,465,982 B2 | 6/2013 | Liu et al. | |
| 8,741,658 B2 | 6/2014 | Boss et al. | |
| 11,287,403 B2 * | 3/2022 | Dasgupta | G01N 30/96 |
| 2001/0026773 A1 | 10/2001 | Small et al. | |
| 2004/0014949 A1 | 1/2004 | Dasgupta et al. | |
| 2004/0048389 A1 | 3/2004 | Liu et al. | |
| 2005/0045032 A1 | 3/2005 | Dasgupta et al. | |
| 2006/0037911 A1 | 2/2006 | Dasgupta et al. | |
| 2006/0186046 A1 | 8/2006 | Liu et al. | |
| 2006/0219634 A1 * | 10/2006 | Parekh | C01D 7/07 210/321.87 |
| 2007/0065343 A1 | 3/2007 | Srinivasan et al. | |
| 2008/0069731 A1 | 3/2008 | Liu et al. | |
| 2008/0311672 A1 | 12/2008 | Dasgupta et al. | |
| 2010/0098588 A1 | 4/2010 | Fujiyama et al. | |
| 2010/0284861 A1 | 11/2010 | Horiike | |
| 2011/0174063 A1 | 7/2011 | Liu et al. | |
| 2013/0032028 A1 * | 2/2013 | Miyazawa | C01B 3/503 95/55 |
| 2013/0090488 A1 * | 4/2013 | Dietz | B01D 61/243 208/263 |
| 2017/0199167 A1 | 7/2017 | Dasgupta et al. | |
| 2017/0322188 A1 | 11/2017 | Dasgupta et al. | |

OTHER PUBLICATIONS

Kenfield, C. F. et al, Environmental Science and Technolog 1988, 22, 1151-1155.*

Kuban, V., Critical Reviews in Analytical Chemistry 1992, 23, 323-354.*

Coelhoso, I.M. et al, Separation and Purification Technology 2000, 19, 183-197.*

Estay, U. et al, Hydrometallurgy 2013, 134-135, 166-176.*

Small, H., "Selected Applications of Ion Chromatography" in Ion Chromatography, Springer, Boston, MA, 1989, 213-245.*

Al-Horr, Rida, Purnendu K. Dasgupta, and Rebecca L. Adams. "Two-dimensional detection in ion chromatography: Sequential conductometry after suppression and passive hydroxide introduction." *Analytical chemistry* 73.19 (2001): 4694-4703.

Berglund, Ingemar, and Purnendu K. Dasgupta. "Two-dimensional conductometric detection in ion chromatography. Postsuppressor conversion of eluite acids to a base." *Analytical Chemistry* 63.19 (1991): 2175-2183.

Berglund, Ingemar, and Purnendu K. Dasgupta. "Two-dimensional conductometric detection in ion chromatography. Postsuppressor conversion of eluite acids to a salt." *Analytical Chemistry* 64.23 (1992): 3007-3012.

Berglund, Ingemar, et al. "Two-dimensional conductometric detection in ion chromatography: sequential suppressed and single column detection." *Analytical Chemistry* 65.9(1993): 1192-1198.

Bond, A. M., et al. "Simultaneous determination of free sulfide and cyanide by ion chromatography with electrochemical detection." *Analytical Chemistry* 54.3 (1982): 582-585.

(56) References Cited

OTHER PUBLICATIONS

Caliamanis, Arety & McCormick, Malcolm & Carpenter, Peter. (2000). Enhanced conductometric detection of cyanide in suppressed ion chromatography. *Journal of chromatography. A.* 884. 75-80.
Caliamanis, Arety, Malcolm J. McCormick, and Peter D. Carpenter. "Conductometric detection of anions of weak acids in chemically suppressed ion chromatography." *Analytical Chemistry* 69.16 (1997): 3272-3276.
Caliamanis, Arety, Malcolm J. McCormick, and Peter D. Carpenter. "Conductometric detection of anions of weak acids in chemically suppressed ion chromatography: Critical point concentrations." *Analytical chemistry* 71.3 (1999): 741-746.
Caliamanis, Arety, Malcolm J. McCormick, and Peter D. Carpenter. "Enhancement of conductometric detection of weak acids in ion chromatography." *Journal of Chromatography A* 850.1-2 (1999): 85-98.
Caliamanis, Arety, Malcolm J. McCormick, and Peter D. Carpenter. "Enhanced conductometric detection of cyanide in suppressed ion chromatography." *Journal of Chromatography A* 884.1-2 (2000): 75-80.
Dasgupta, Purnendu K. "Postcolumn techniques: A critical perspective for ion chromatography." *Journal of chromatographic science* 27.8 (1989): 422-448.
Dasgupta, Purnendu K., and Liyuan Bao. "Suppressed conductometric capillary electrophoresis separation systems." *Analytical Chemistry* 65.8 (1993): 1003-1011.
Davis, James C., and Dennis P. Peterson. "Hollow fiber post-column reactor for liquid chromatography." *Analytical Chemistry* 57.3 (1985): 768-771.
Diggens, A. A. et al., The International Water Conference 39th Annual Meeting 1978, 83-88, Engineers' Society of Western Pennsylvania.
Diggens, A. A. et al., "High-Purity Water Quality Monitoring Based on Ion-Selective Electrode Technology," Power Plant Instrumentation for Measurement of High-Purity Water Quality, STP742-EB, Lane, R. and Otten, G., Ed., ASTM International, West Conshohocken, PA, 1981, pp. 131-138.
Frenzel, Wolfgang. "Gas-diffusion separation and flow injection potentiometry." *Fresenius' Journal of Analytical Chemistry* 336.1 (1990): 21-28.
Frenzel, Wolfgang, and Cheng-Yu Liu. "Potentiometric and conductometric determination of ammonium by gas-diffusion flow injection analysis." *Fresenius' journal of analytical chemistry* 342. 4-5 (1992): 276-280.
Goodwin, Lorne R., et al. "Determination of trace sulfides in turbid waters by gas dialysis/ion chromatography." *Analytical Chemistry* 60.3 (1988): 216-219.
Gross, Ulrike, et al. "A General Continuous Flow Method for Palladium Catalysed Carbonylation Reactions Using Single and Multiple Tube-in-Tube Gas-Liquid Microreactors." *European Journal of Organic Chemistry* 2014.29 (2014): 6418-6430.
Guile, Geoffrey R., et al. "Analytical and Preparative Separation of Anionic Oligosaccharides by Weak Anion-Exchange High-Performance Liquid Chromatography on an Inert Polymer Column," *Analytical Biochemistry* 222, 1994, pp. 231-235.
Haginaka, Jun, and Junko Wakai. "Liquid chromatographic determination of barbiturates using a hollow-fibre membrane for postcolumn pH modification." *Journal of Chromatography A* 390.2 (1987): 421-428.
Han, Binbing, Zhisong Shen, and S. Ranil Wickramasinghe. "Cyanide removal from industrial wastewaters using gas membranes." *Journal of membrane science* 257.1-2 (2005): 171-181.
Hirs, C.H.W., et al. "The Chromatography of Amino Acids on Ion Exchange Resins. Use of Volatile Acids for Elution," *Laboratories of the Rockefeller Institute for Medical Research*, Dec. 5, 1994, pp. 6063-6065.

Hu, Zhen Zhen, et al. "Determination of inorganic anions in ethyl acetate by in-line hollow fiber membrane extraction with ion chromatography." *Chinese Chemical Letters* 20.12 (2009): 1498-1501.
Karu, Naama, et al. "Determination of pharmaceutically related compounds by suppressed ion chromatography: II. Interactions of analytes with the suppressor." *Journal of Chromatography A* 1224 (2012): 35-42.
Kolotilina, N. K., and A. M. Dolgonosov. "Ion-chromatographic determination of borates and sulfides with the use of a developing column." *Journal of Analytical Chemistry* 60.8 (2005): 738-742.
Kuban, Vlastimil, and Purnendu K. Dasgupta. "Selective determination of gases by two-stage membrane-differentiated flow injection analysis. Determination of trace hydrogen cyanide in the presence of large concentrations of hydrogen sulfide." *Analytical Chemistry* 64.10(1992): 1106-1112.
Liao, Hongzhu, et al. "2D detection in ion chromatography: Sequential conductometry after suppression and diethylamine introduction." Abstracts of Papers of the American Chemical Society. vol. 247. 1155 16th St, NW, Washington, DC 20036 USA: Amer Chemical Soc, 2014.
Liao, Hongzhu, et al. "Mixing characteristics of mixers in flow analysis. Application to two-dimensional detection in ion chromatography." *Analytical chemistry* 87.1 (2015): 793-800.
Liao, Hongzhu, Akinde Florence Kadjo, and Purnendu K. Dasgupta. "Concurrent high-sensitivity conductometric detection of volatile weak acids in a suppressed anion chromatography system." *Analytical chemistry* 87.16 (2015): 8342-8346.
Liao, H., Dissertation Dec. 2015, 2009 pages.
Liao, Hongzhu, and Purnendu K. Dasgupta. "Permeative amine introduction for very weak acid detection in ion chromatography." *Analytical chemistry* 88.4 (2016): 2198-2204.
Liu, Yan, et al. "Photodissociation/gas diffusion/ion chromatography system for determination of total and labile cyanide in waters." *Analytical Chemistry* 62.7 (1990): 766-770.
Lu, K. "Determination of total cyanides and sulfides in wastewater using ion chromatography coupled with ultraviolet photo-dissociation/gas-membrane diffusion." *Se pu= Chinese journal of chromatography* 33.3 (2015): 298-303.
Luo, Jingyi, et al. "Diffusion dialysis-concept, principle and applications." *Journal of Membrane Science* 366.1-2 (2011): 1-16.
Mana, Hasson, and Uwe Spohn. "Sensitive and selective flow injection analysis of hydrogen sulfite/sulfur dioxide by fluorescence detection with and without membrane separation by gas diffusion." *Analytical chemistry* 73.13 (2001): 3187-3192.
Manickam, Matheswaran, et al. "Dehydration of Nitric acid Solution by Membrane Distillation with Co-Current liquid flow regime. ", 2005, 11, 2137-2140.
Merkel, T. C., and L. G. Toy. "Comparison of hydrogen sulfide transport properties in fluorinated and nonfluorinated polymers." *Macromolecules* 39.22 (2006): 7591-7600.
Miralles, Esther, and Dolors Prat. "On-line gas-diffusion separation and fluorimetric detection for the determination of acid dissociable cyanide." *Analyst* 123.2 (1998): 217-220.
Pencharee, Somkid, et al. "Underway determination of dissolved inorganic carbon in estuarine waters by gas-diffusion flow analysis with C 4 D detection." *Analytical Methods* 4.5 (2012): 1278-1283.
Petruczynik, Anna, Monika Waksmundzka-Hajnos, and Michal L. Hajnos. "The effect of chromatographic conditions on the separation of selected alkaloids in RP-HPTLC." *Journal of chromatographic science* 43.4 (2005): 183-194.
Philips, Denise A., and Purnendu K. Dasgupta. "A diffusion scrubber for the collection of gaseous nitric acid." *Separation Science and Technology* 22.4 (1987): 1255-1267.
Pietrzyk, D. J., and Dicinoski GW DJ. "GW. Ion chromatography." *Encyclopedia of analytical chemistry.* New York: John Wiley & Sons (2010), 30 pages.
Piskunova, M. S., and G. M. Sergeev. "Use of flow-injection conductometry of strong and weak protolytes in solutions containing amino acids." *Journal of Analytical Chemistry* 56.5 (2001): 474-480.

(56) References Cited

OTHER PUBLICATIONS

Rokushika, Souji, Zhuo Lian Sun, and Hiroyuki Hatano. "Anion chromatography of carboxylic acids and keto acids using a hollow-fibre suppressor." *Journal of Chromatography A* 253 (1982): 87-94.

Rocklin, Roy D., and Edward L. Johnson. "Determination of cyanide, sulfide, iodide, and bromide by ion chromatography with electrochemical detection." *Analytical Chemistry* 55.1 (1983): 4-7.

Shelor, C. Phillip, Purnendu K. Dasgupta, and Hongzhu Liao. "Conductometric gradient ion exclusion chromatography for volatile fatty acids." *Analytical chemistry* 88.24 (2016): 12323-12329.

Sjoegren, Anna, and Purnendu K. Dasgupta. "Two-dimensional conductometric detection in ion chromatography. Analyte identification, quantitation of very weak acid anions, and universal calibration." *Analytical Chemistry* 67.13 (1995): 2110-2118.

Slingsby, Rosanne W. "Gradient elution of aliphatic carboxylic acids by ion chromatography in the ion-suppression mode." *Journal of Chromatography A* 371 (1986): 373-382.

Stevens, Timothy S., James C. Davis, and Hamish Small. "Hollow fiber ion-exchange suppressor for ion chromatography." *Analytical Chemistry* 53.9 (1981): 1488-1492.

Sulistyarti, Hermin, et al. "On-line determination of cyanide in the presence of sulfide by flow injection with pervaporation." *Analytica chimica acta* 390.1-3 (1999): 133-139.

Sun, Liangliang, et al. "Integrated device for online sample buffer exchange, protein enrichment, and digestion." *Analytical chemistry* 82.6 (2010): 2574-2579.

Tarver, Gary A., and Purnendu K. Dasgupta. "Design and development of a system to measure ambient levels of hydrogen sulfide and lower mercaptans from a mobile platform." *Atmospheric Environment* 29.11 (1995): 1291-1298.

Toda, Kei, et al. "Membrane-based microchannel device for continuous quantitative extraction of dissolved free sulfide from water and from oil." *Analytica chimica acta* 741 (2012): 38-46.

Vallejo-Pecharromán, B., and MD Luque de Castro. "Determination of cyanide by a pervaporation-UV photodissociation-potentiometric detection approach." *Analyst* 127.2 (2002): 267-270.

Van Gool, Jasper JF, et al. "Highly Controlled Gas/Liquid Processes in a Continuous Lab-Scale Device." *Chemical Engineering & Technology* 36.6 (2013): 1042-1046.

Zacharis, Constantinos K., et al. "Amperometric determination of cyanides at the low ppb level by automated preconcentration based on gas diffusion coupled to sequential injection analysis." *Talanta* 77.5 (2009): 1620-1626.

Qi, Zhang, and E. L. Cussler. "Hollow fiber gas membranes." *AIChE journal* 31.9 (1985): 1548-1553.

* cited by examiner

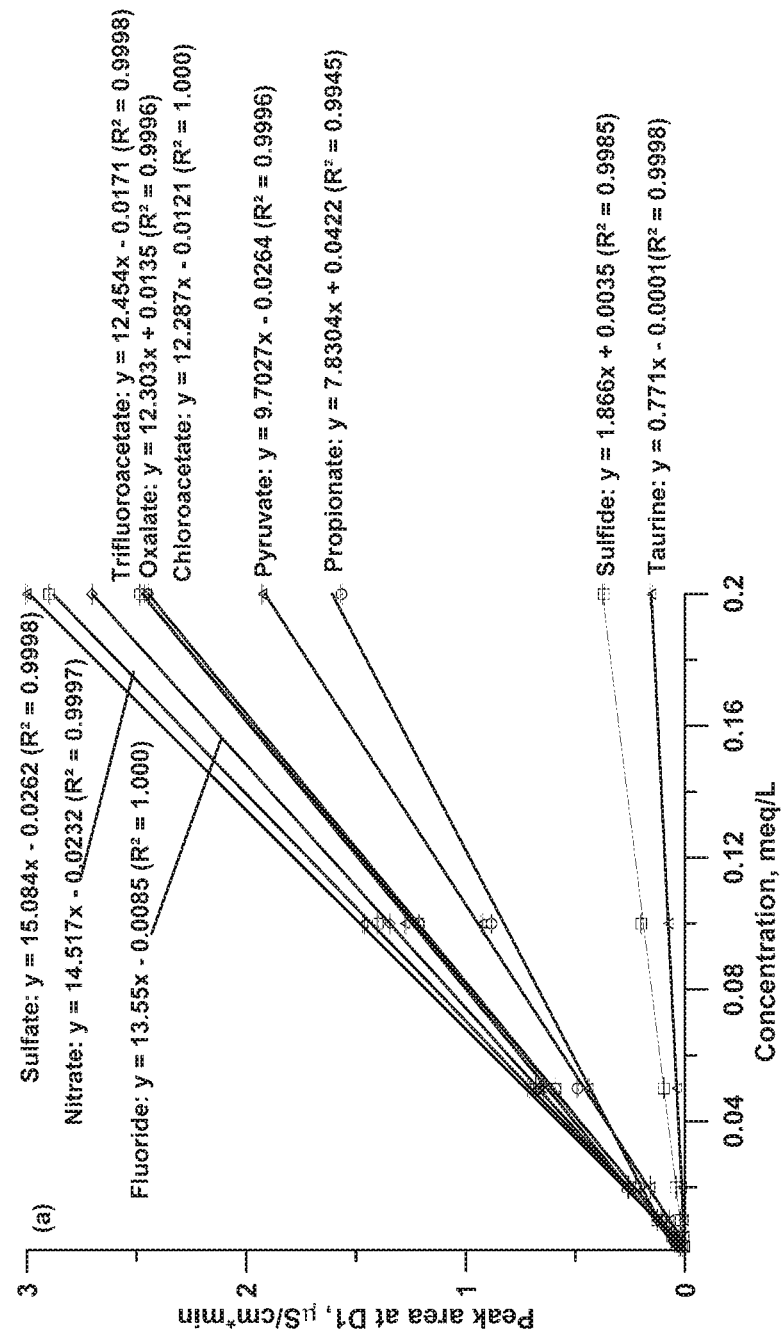

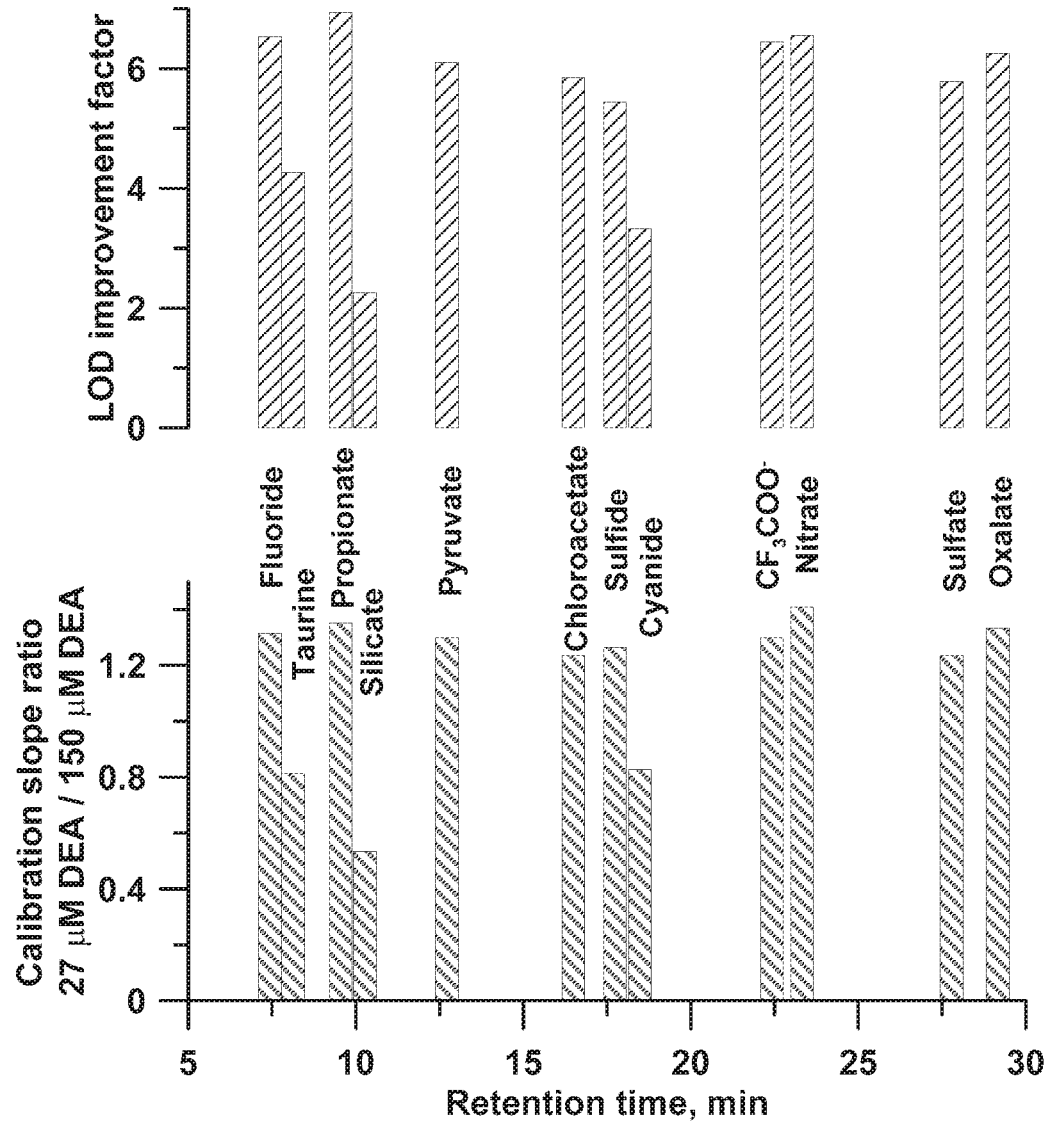

FIG. 18A
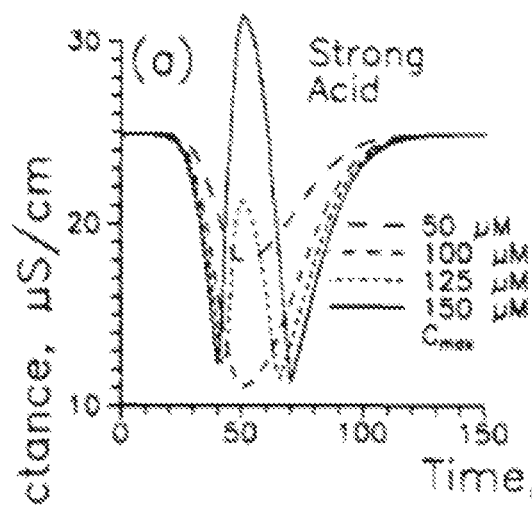
FIG. 18B
FIG. 18C
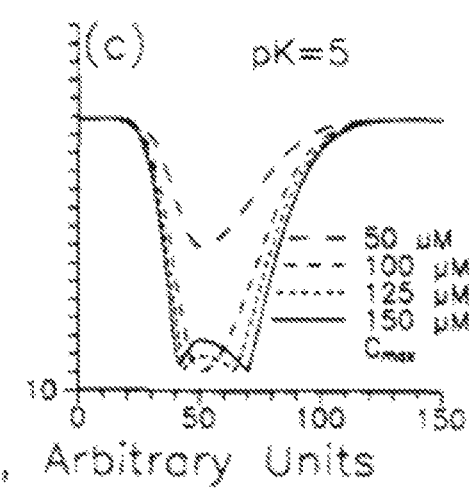
FIG. 18D
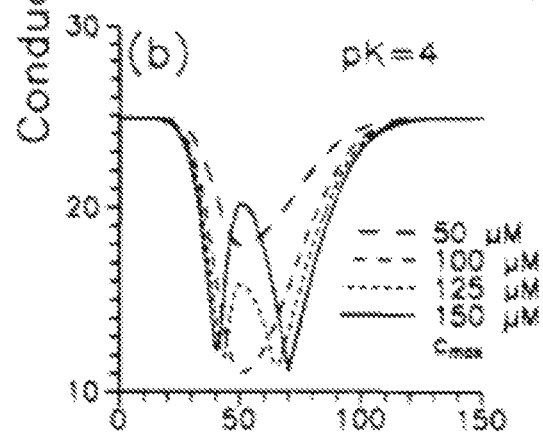
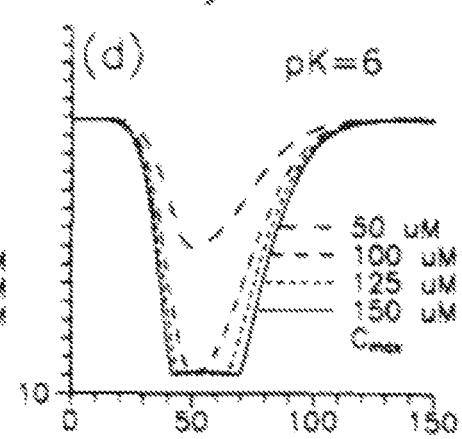

PERMEATIVE AMINE OR ACID INTRODUCTION FOR VERY WEAK ACID DETECTION IN ION CHROMATOGRAPHY

CROSS-REFERENCE TO RELATED APPLICATIONS

This application is a continuation application of U.S. patent application Ser. No. 15/377,833, entitled ION CHROMATOGRAPHY SYSTEM AND METHODS UTILIZING A WEAK ACID OR WEAK BASE EXTRACTION DEVICE, filed Dec. 13, 2016, now U.S. Pat. No. 11,287,403, which claims the benefit of U.S. Provisional Patent Application No. 62/276,154, entitled PERMEATIVE AMINE OR ACID INTRODUCTION FOR VERY WEAK ACID DETECTION IN ION CHROMATOGRAPHY, filed Jan. 7, 2016, the entire disclosures of which are incorporated by reference herein.

FIELD OF THE INVENTION

The present invention relates to ion chromatography and enhanced detection of weakly dissociating analytes of interest.

BACKGROUND OF THE INVENTION

Suppressed conductometric anion chromatography (SCAC) applications range from trace analysis in semiconductor manufacturing[i] to pharmaceutical analysis[ii] to name a few. While SCAC excels in measuring strong acid anions, weak acid anions respond poorly or not at all. Even though acids with $pK_a < 7$ show some response, they do so in a nonlinear manner. Anions from very weak acids ($pK_a \geq 7.0$), e.g., silicate or cyanide are essentially not measurable.

The present invention relates to a method and apparatus using ion chromatography ("IC") in which the suppressed analyte is converted to a salt prior to detection.

Ion chromatography is a known technique for the analysis of ions which typically includes a chromatographic separation zone using an eluent containing an electrolyte, and an eluent suppression stage, followed by detection, typically performed by a conductivity detector. In the chromatographic separation stage, ions of an injected sample are eluted from a separation column. In the suppression stage, electrical conductivity of the eluent electrolyte is suppressed but not that of the separated ions, if the latter is derived from a strong acid or base. In the first generation of ion chromatography, suppression or stripping of electrolyte used an ion exchange resin bed. In an improved form of suppression, a charged membrane in the form of a fiber or sheet is used in place of the resin bed. In sheet form, the sample and eluent are passed on one side of the sheet with a flowing regenerant on the other side of the sheet. The sheet comprises an ion exchange membrane partitioning the regenerant from the effluent of chromatographic separation. The membrane passes ions of the same charge as the exchangeable ions of the membrane to convert the electrolyte of the eluent to weakly ionized form, followed by detection of the ions.

One effective form of suppressor is described in U.S. Pat. No. 4,999,098. In this apparatus, the suppressor includes at least one regenerant compartment and one chromatographic effluent compartment separated by an ion exchange membrane sheet. The sheet allows transmembrane passage of ions of the same charge as its exchangeable ions. Ion exchange screens are used in the regenerant and effluent compartments. Flow from the effluent compartment is directed to a detector, such as an electrical conductivity detector, for detecting the resolved ionic species. The screens provide ion exchange sites and serve to provide site to site transfer paths across the effluent flow channel so that suppression capacity is no longer limited by diffusion of ions from the bulk solution to the membrane. A sandwich suppressor is also disclosed including a second membrane sheet opposite to the first membrane sheet and defining a second regenerant compartment. Spaced electrodes are disclosed in communication with both regenerant chambers along the length of the suppressor. By applying an electrical potential across the electrodes, there is an increase in the suppression capacity of the device. The patent discloses a typical regenerant solution (acid or base) flowing in the regenerant flow channels and supplied from a regenerant delivery source. In a typical anion analysis system, sodium hydroxide is the eluent and sulfuric acid is the regenerant. The patent also discloses using water to replace the regenerant solution in the electrodialytic mode. In an improved form of membrane suppressor, described in U.S. Pat. No. 5,352,360, effluent from the detector is recycled through the regenerant flow channels.

In Berglund, I., et al. *Anal. Chem.* 63: 2175 (1991), another multiple detector system is described. Here, conventional IC is performed using a first conductivity detector. The effluent from that detector is passed sequentially through cation exchange and anion exchange conversion zones. For anion analysis, the effluent from the first detector is in the usual IC form of HX (wherein X is the analyte anion) as it exits from the suppressor. Two different types of convertors are disclosed. In a sequential packed column form, the effluent first passes cation (sodium) exchange resin and then anion (hydroxide) exchange resin, resulting in sequential conversion first to NaX salt and thereafter to NaOH. A permselective membrane-type convertor is also disclosed for such sequential conversion. After conversion, the ion conductivity of the sodium hydroxide is measured in the second detector and compared to the ion conductivity of the first detector. The paper states that the data reveals peaks due to very weak acids hidden in the suppressed base line or overlapped with strong acid peaks. It further states that this method allows an estimation of the pK of the analyte peak and permits approximate quantitation without standards. Problems with that system include the following: (1) incomplete conversion of the acid form analyte to NaOH due to differences in ion exchange selectivity between hydronium and sodium, and analyte anion and hydroxide on the cation and anion exchange resins respectively; and (2) analyte band dispersion in the ion exchange columns must be compensated for when ratioing the signals from the two detectors. For weak acids, for example, it can be more of a problem, because there is less free hydronium ion available to exchange for sodium ion.

In PCT Publication WO 9418555, apparatus and methods are disclosed using IC principles in which different detectors provide useful comparative signals. Specifically, in one form of the apparatus, separating means, typically in the form of a chromatographic resin column, separates the analyte ions in the presence of an eluent comprising electrolyte. The effluent from the separating means flows through suppressor means for converting the electrolyte to weakly ionized form and the analyte ions to acid or base form. The suppressed effluent flows through a first detector for detecting the conductivity of the ionic species and generates a first signal. This portion of the system is conventional suppressed IC. The effluent from the first detector flows through a salt convertor for converting the analyte ions in acid or base form and to salt form. Then, the conductivity of the salt form of the analyte is measured in a second detector means and a second signal is generated. The first and second signals are analyzed to represent a defined relationship between the output signals.

In one embodiment of WO 9418555, the analyte ions in acid or base form are converted to their corresponding salts in a single conversion with salt-forming ions of opposite charge. For example, for analyte anions represented by "X", and using $Na^+$ ion, NaX is measured in the second detector means. This is referred to herein as the "single conversion mode." It discloses a salt convertor which minimizes dispersions which could skew peak ratios of the single conversion type. One disclosed single conversion convertor is an on-line microelectrodialytic ion source which supplies the salt-forming ion through a membrane. It includes a salt-forming ion source channel, a suppressor effluent flow channel and a permselective ion exchange membrane partitioning the two channels. The membrane includes exchangeable ions of the same charge as the salt-forming ions and is resistant to transmembrane passage of the ionic species. An electrical potential is applied between the ion source channel and suppressor effluent flow channel. The latter channel is in fluid communication with the effluent from the suppressor. In operation, the signal generated in the first conductivity detector for the acid or base form of the analyte is evaluated with the signal generated in the second ion conductivity detector for the salt form of the analyte to provide extremely useful information. Other disclosed single conversion convertors include the use of an ion exchange membrane barrier without electrolysis, but with external acid or base concentrations sufficient to overcome the Donnan barrier. Still other systems include the use of a porous membrane barrier using the application of current or differential pressure to drive the acid or base salt-forming ions into the suppressor effluent flow channel. Single conversion is also disclosed by flowing the suppressor effluent stream through an ion exchange medium such as a column of an ion exchange resin bed having exchangeable ions of opposite charge to the analyte ions.

WO 9418555 also discloses a "double conversion mode" in which the analyte ions are twice-converted. In this instance, the analyte ion is converted to a salt of (a) the same type of counterion as in the single conversion mode, and (b) a common single ion of the same charge as the analyte ion by simultaneous ion exchange of the acid of base form of the analyte ions with the selected anion and cation. In one embodiment using a permselective membrane, the suppressor effluent flows in a central channel flanked by two ion source channels, one including anions and the other including cations. Permselective membranes separate the ion source channels from the suppressor effluent flow channel and include exchangeable ions of a type which permit transport of such cations and anions into the suppressor effluent flow channel to accomplish double conversion. In another simultaneous double conversion, the suppressor effluent flows from the first detector through ion exchange medium such as an ion exchange resin bed, including exchangeable anions and cations of the same type desired as in the permselective membrane. Sequential double conversion is also disclosed. In one embodiment, the suppressor effluent flows from the first detector sequentially through two ion exchange columns of opposite charge. For example, the first column includes a common, single ion of the same charge as the analyte ions so that a converted acid or base with a common anion or cation is formed in the first column which is passed to the second column for conversion to a salt, or the order of the columns may be reversed. Also, it discloses a permselective membrane system for the sequential double conversion embodiment.

Another attempt to convert suppressed chromatography effluent to a salt using a membrane suppressor in the chemical mode with countercurrent flow is disclosed in Yuan Huang, Shi-fen Mou, Ke-na Liu, *J. Chromatography*, A 832:141-148 (1999). In this approach, only enough regenerant solution was provided so that suppression was incomplete. However, it is difficult to control the background and noise. The device is extremely sensitive to both the regenerant flow rate and the eluent flow rate for a given regenerant concentration.

U.S. Pat. No. 4,455,233 discloses another approach to salt conversion, using an eluent with an acid or base with a co-ion of the same charge as the ions analyzed, in which the co-ions being in the hydronium or hydroxide form. In this approach, the electrolyte for anions is an acid and the eluent for the cation is a base. Both the eluent and the analyte are converted to salt form. Although the eluent has a lower conductivity in the salt form than the conductive form, the background in this approach can be as high as 100 US/cm. Such high backgrounds result in higher chromatographic noise. The above approach is generally not compatible with commonly used eluents for ion chromatography and require eluents that readily get converted to the salt form of lower background.

A recent review by Karu et al.[iii] addresses various efforts towards weak acid detection by modified SCAC; the most promising approach identified was strong base (e.g., NaOH) introduction after a conventional hydroxide eluent SCAC system, followed by a second conductivity detector (D2).[iv-v] After NaOH introduction, a fraction f of the eluite acid HX is converted to NaX; $f \leq 1$ and increases with decreasing $pK_a$ (for example, f will be 0.5 for an acid with a $pK_a$ of 10 if the pH after base introduction is 10). The D2 signal is thus negative and equals $fC(\lambda_{X^-} - \lambda_{OH^-})$ where C is the eluite concentration in eq/L, and $\lambda_{X^-}$ and $\lambda_{OH^-}$ are the limiting equivalent conductance of $X^-$ and $OH^-$, respectively. The approach is particularly attractive for very weak acids ($10 > pK_a \geq 7$) that respond insignificantly in SCAC. The combination of the SCAC signal (D1) and that from D2 can also be used to identify coelution, estimate $pK_a$'s and perform universal calibration.[4,5] The general approach has been extended so it can be used with standard commercially available equipment but very weak acid LODs remained at single digit μM levels.[vi] Recently, it was demonstrated that volatile weak acid eluites, notably $H_2S$ and HCN (also $CO_2$) can be transported into a base stream through a nonpolar membrane.[vii] No liquid mixing is involved and noise improves by $\geq 100\times$, proportionately improving the LODs. This does not of course work for nonvolatile inorganic acids which constitute the majority, e.g., borate, arsenite, and notably, silicate.

There remains a need in suppressed chromatography for efficient systems to convert weakly dissociated analytes into salt form and to facilitate detection of such analytes or subsequent reaction products against a low background. The present invention provides a suppressor, a system including the suppressor and methods of using the suppressor and system to satisfy this need.

SUMMARY OF THE INVENTION

The present invention provides a solution to a problem long recognized but previously unsolved in the field of ion exchange chromatography, the separation and detection of weakly dissociating acids and bases. The invention provides a device and method for introducing a volatile acid or base into an eluent stream containing the analyte of interest. The volatile acid or base effects dissociation of the analyte of interest, present as a base or an acid, respectively. The dissociated analyte is detectable against a low background of the volatile acid or base. In various embodiments, the dissociated analyte of interest is detected using a conductivity detector.

In an exemplary embodiment, the invention provides a device for forming a salt of a weakly dissociating acid or base following a chromatographic separation of a mixture containing the acid or base by passage of said mixture through a chromatographic medium. An exemplary device is configured for integration into a chromatographic system downstream of the chromatographic medium and comprises a permeable membrane immersed in a solution of a volatile base or acid. The membrane is in any useful format (e.g., flat or tubular). The permeable membrane allows the passage of the volatile base or acid from the solution into a lumen of the permeable membrane where it contacts a flowing effluent from the chromatographic column, converting either weakly ionized acids or weakly ionized base to the corresponding salts of the volatile bases or volatile acids.

In another aspect of the invention, the salt conversion is performed in a permeable membrane device of the invention utilizing a volatile acid or base in contact with the external surface of the permeable membrane. The acid or base (or a solution thereof) can be in direct contact with the membrane, or the membrane can be in contact with acid or base vapor, e.g., the membrane is suspended proximate to the acid or base (or solution thereof). Another embodiment of the invention comprises a system for performing the above methods including (a) a chromatographic separator having an inlet and an outlet for separating said analyte ions in the presence of an eluent comprising electrolyte counterions of opposite charge to said analyte ions, (b) a suppressor, and (c) a permeable membrane device of the invention utilizing a volatile acid or base.

One embodiment of the present invention relates to a method for suppressed ion analysis of an analyte ion or a plurality of different analyte ions in a sample solution. The analyte ions are detected as salts of the analyte ions formed by reaction with a volatile base or volatile acid in the permeant membrane device of the invention. The method includes the following steps: (a) eluting the sample solution with an eluent, comprising electrolyte counterions of opposite charge to the analyte ions, through a separating medium effective to separate the analyte ions to form a separating medium effluent stream, (b) flowing the separating medium effluent stream through a suppression zone in which electrolyte counterions are removed to convert the electrolyte to weakly ionized form to form a suppressor sample effluent stream, (c) converting the analyte ions in the suppressor sample effluent stream into salts in a permeant membrane device by reaction with a volatile base or volatile acid to form an analyte salt stream. Thereafter, the analyte salt is detected.

In another embodiment of the present invention the, the salt conversion is performed post separation by mixing with a stream comprising of the volatile acid or base followed by detection using preferably a conductivity detector. In this embodiment a membrane interface for introducing the volatile acid or base is not used where the volatile acid or base liquid is added directly to the post column eluent stream.

Other embodiments, objects and advantages of the invention will be apparent from the detailed description provided herein.

BRIEF DESCRIPTION OF THE DRAWINGS

In FIG. 12A the styrene sulfonate peak is readily identifiable and its presence as a graft monomer is readily explicable. However, it accounts for an insignificant portion of the total ion current, much of which is centered around m/z 500-600.

FIG. 12B. Positive ion mode ESI-MS scans of the suppressors of two different suppressors, conditions same as in FIG. 12A. The ordinate scaling is the same as in FIG. 12A to illustrate the vast difference in background between positive and negative mode. The ASRS300 data are offset by 1,5000000 counts so both can be plotted on the same figure.

Also, the UV absorbance of the suppressor effluent is measurable only at very low wavelengths (<205 nm), the spectra are featureless with the absorbance rising monotonically at decreasing wavelengths (FIG. 14), suggesting that the species responsible may not be aromatic.

Figure 14:
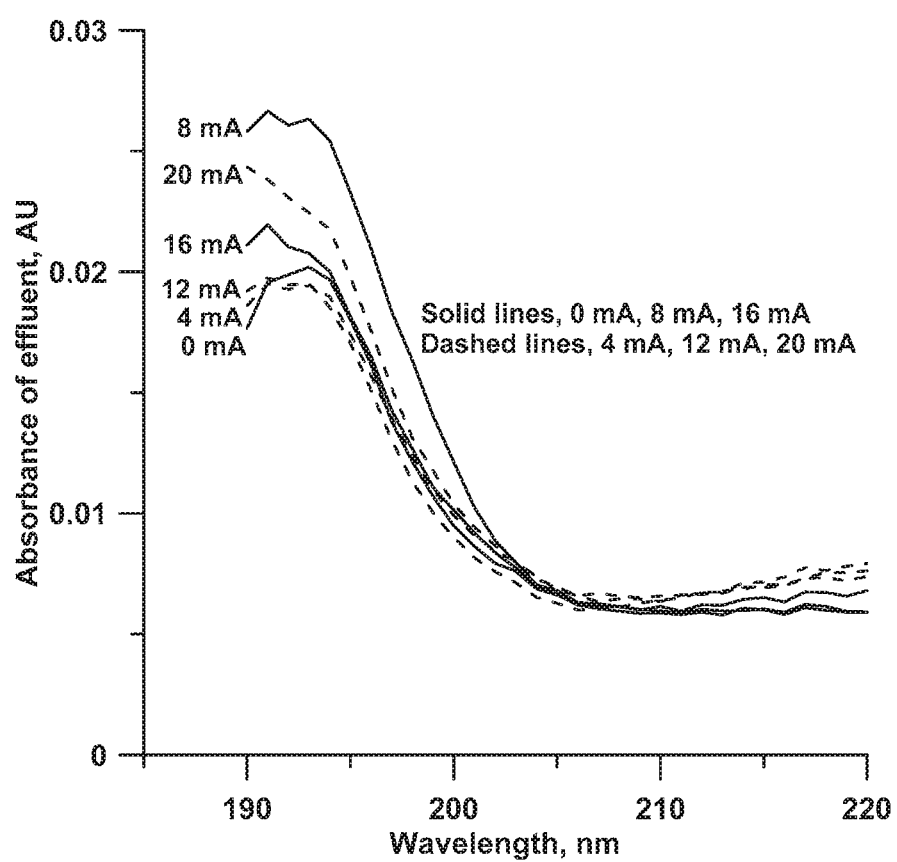

FIG. 14. Absorption spectra of the suppressed detector effluent for a 2 mM electrogenerated KOH eluent at various suppressor currents. The spectrum is featureless and shows a general exponential rise at $\lambda$<205 nm. While there is probably a general increase in the low UV absorbing impurity with current, it is not particularly reproducible and the absorbance is very low.

Figure 15:
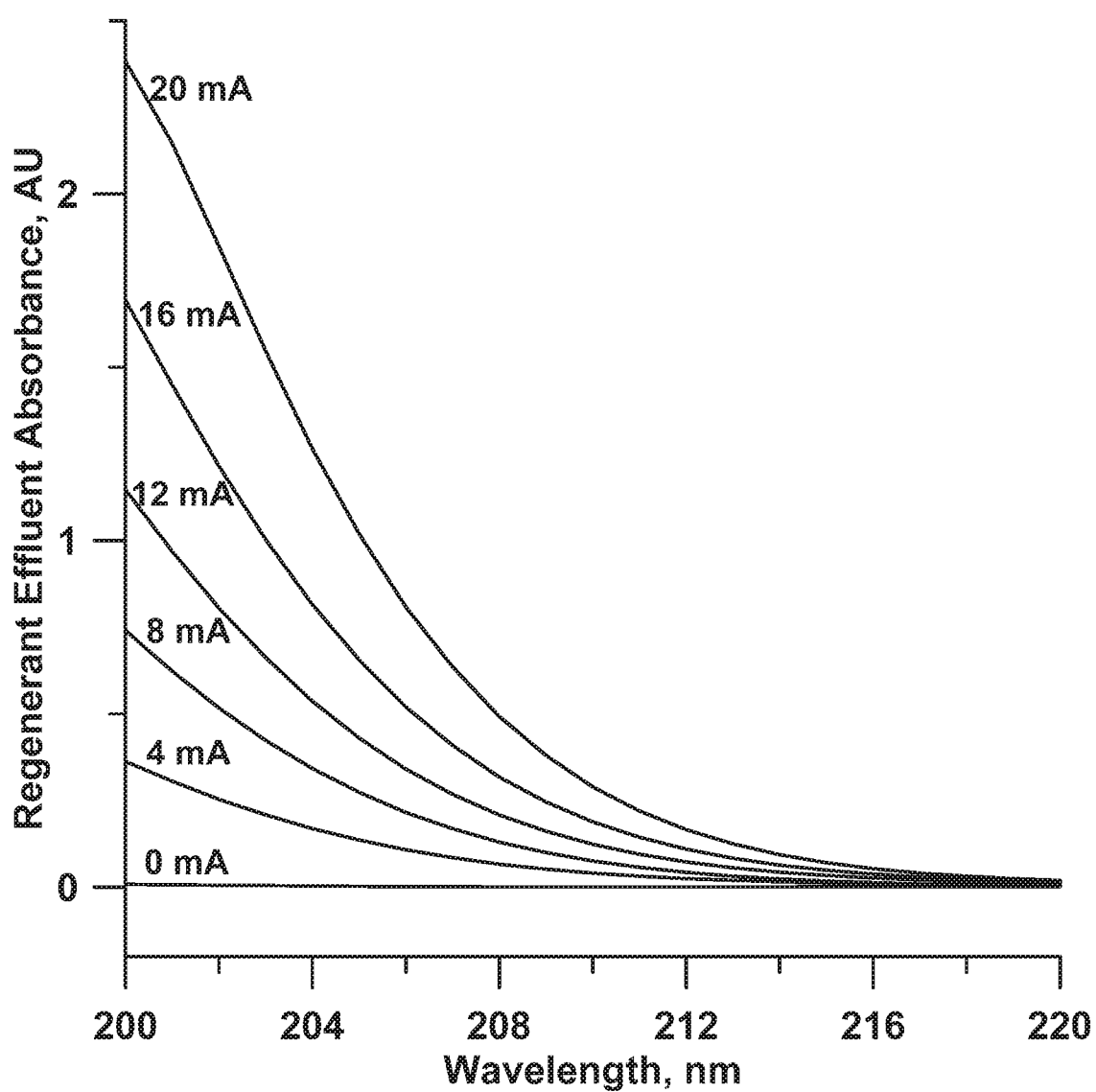

FIG. 15 Low wavelength absorbance spectra of the regenerant channel effluent at various suppressor currents collected from an ESRS500 suppressor and measured offline after 5× dilution. Eluent 2 mM KOH at 0.3 mL/min. Compare with the data in FIG. 14; the peak absorbances are approximately 100× greater. Note that no significant absorption or spectral features were observed at $\lambda$>220 nm. It is also of interest to note in this context that some degradation products accumulate even when a suppressor is not in use. When a suppressor is first used after prolonged storage, both UV and mass spectral studies indicate that the impurity background is much higher and a steady state value is reached only after prolonged washing/use. For most applications, the increase in noise will not be perceptible but in particular applications, reaching a steady state may require up to a week of continuous use.

FIG. 16A, FIG. 16B, FIG. 16C, and FIG. 16D. Calibration curves relevant to FIG. 4. (a) Calibration curves at D1; (b), (c), (d) calibration curves at D2: solid traces for 150 µM DEA (30.8 µS/cm background) and dashed traces for 27 µM DEA (background 5.5 µS/cm). Concentrations range from 2-200 µeq/L for each ion.

FIG. 17A and FIG. 17B. LOD ratios and calibration slope ratios of various anion at D2 between using 150 µM and 27 µM [DEA]. Limits of detection are listed in Table 2. The background conductance levels are 30.8 µS/cm and 5.5 µS/cm, respectively, with corresponding baseline noise levels of 4.4 and 0.83 nS/cm, respectively. A slope ratio of unity indicates sensitivity did not change while a value<1 indicates it was lower for a lower background [DEA] (taurine, silicate, cyanide). The LOD ratios fall within a range of 0.1-0.5, corresponding to a 10-2× improvement in the LOD in going from 150 to 27 µM [DEA].

FIG. 18A, FIG. 18B, FIG. 18C, and FIG. 18D. Responses for different concentrations (50-150 µM at the peak apex, D2 background 100 µM NaOH) of a monoprotic eluite acid ranging from (a) strong acid to (d) pK=6. The simulated peak profile is modified Gaussian and the equivalent conductance of the anion ($\lambda_{X-}$) is assumed to be 60. W-shaped peaks produced from an inadequate background base concentration. Reproduced from Sjögren, A.; Dasgupta, P. K. *Anal. Chem.* 1995, 67, 2110-2118. doi:10.1021/ac00109a033.

Figure 19:
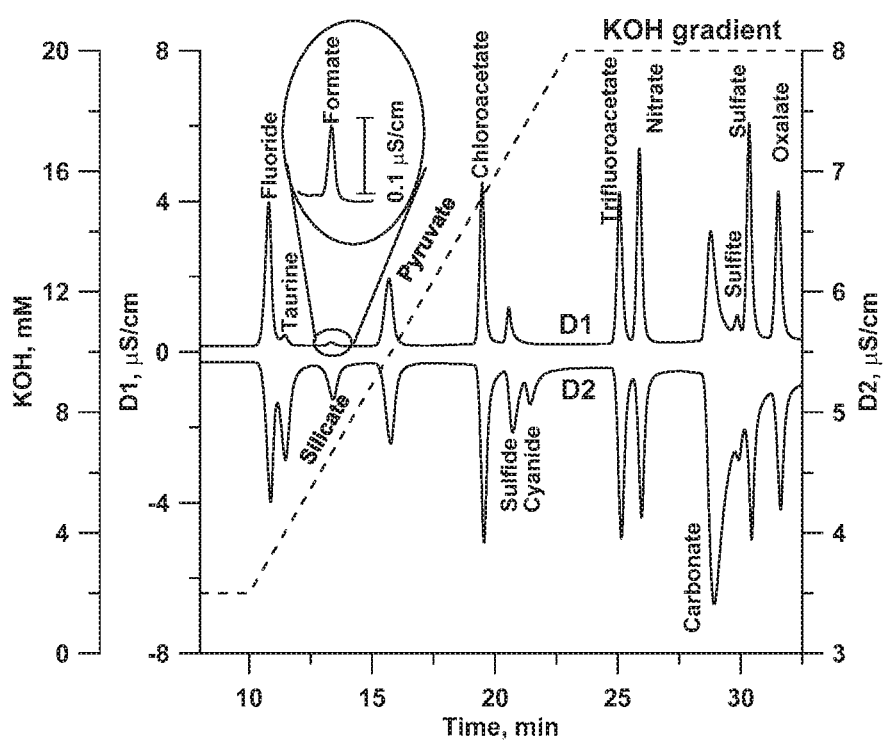

FIG. 19. Dual conductometric detection using 1.0 mL sample injection. Sample injection time, 0.0 min; sample loading time, 32.5 min; current of suppressor, 0 mA from 6-32.5 min and 20 mA in the rest of time. 1.0 mL injection of 1.0 µeq/L for each ion. Carbonate results from $CO_2$ intrusion to sample. Sulfite is an impurity in the sulfide standard used. Formate impurity comes from both the cyanide standard and intrusion from formic acid in ambient air to the sample.

Figure 20A:
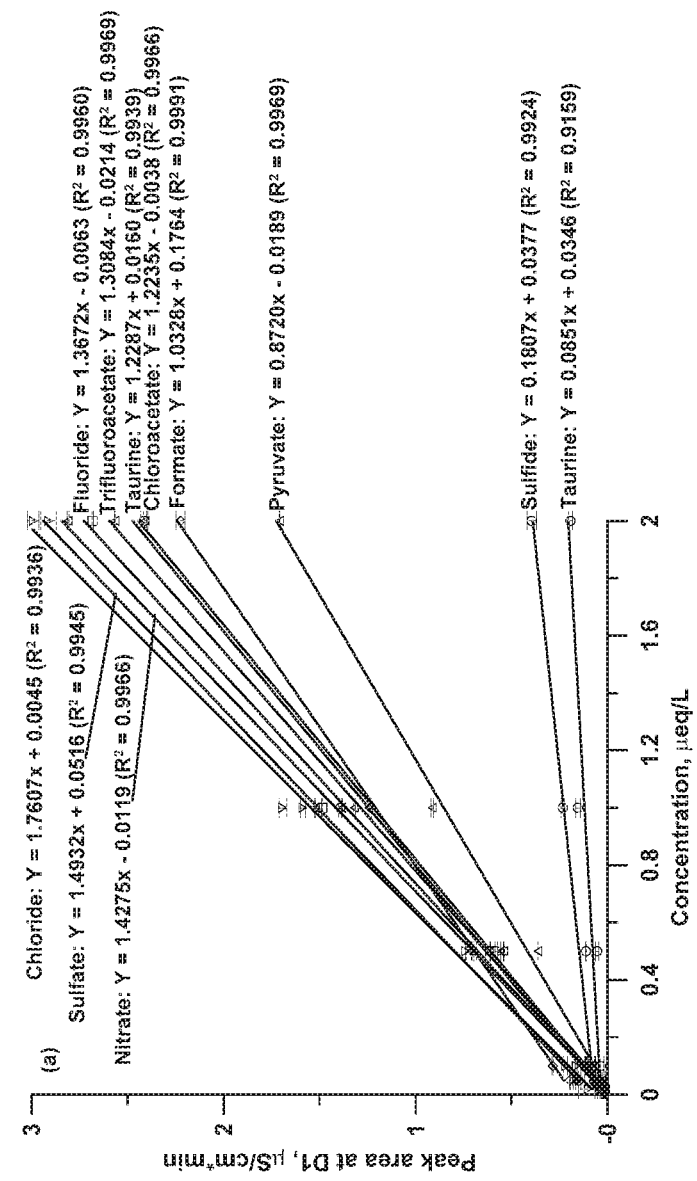
Figure 20B:
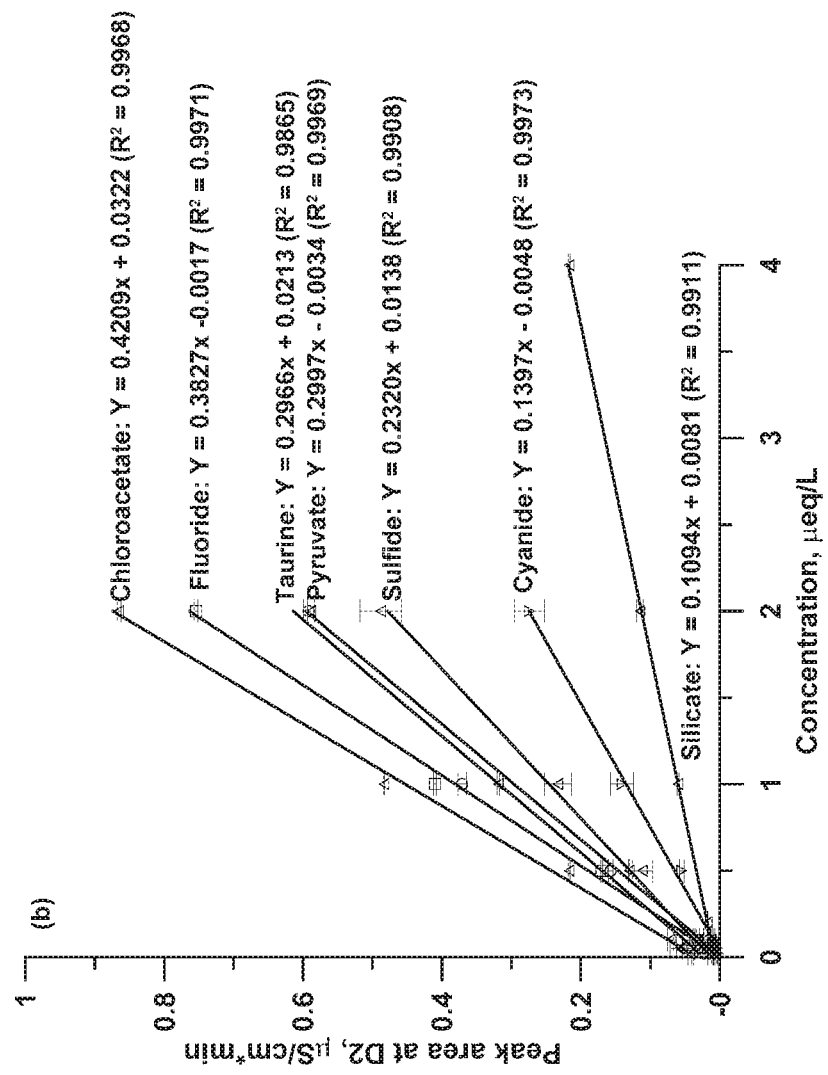
Figure 20C:
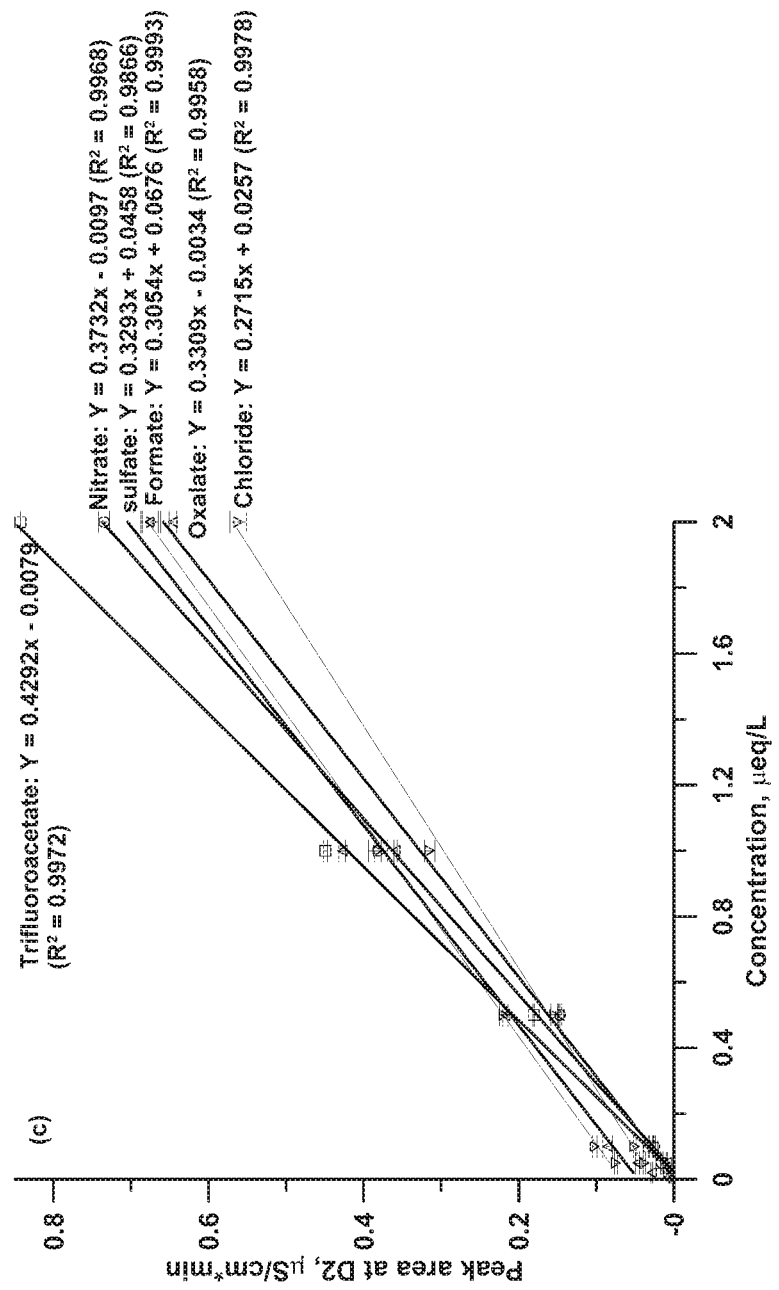

FIG. 20A, FIG. 20B, and FIG. 20C. Calibration curves at D1 and D2. FIG. 20A shows calibration curves based on the output of D1, and FIGS. 20B and 20C show calibration curves based on the output of D2. The calibration ranges are from 0.04-4.0 µeq/L for silicate and 0.02-2.0 µeq/L for all other ions. Quantifications of silicate, formate and chloride were achieved using AS24 column, all others on AS 11 column.

Figure 21A:
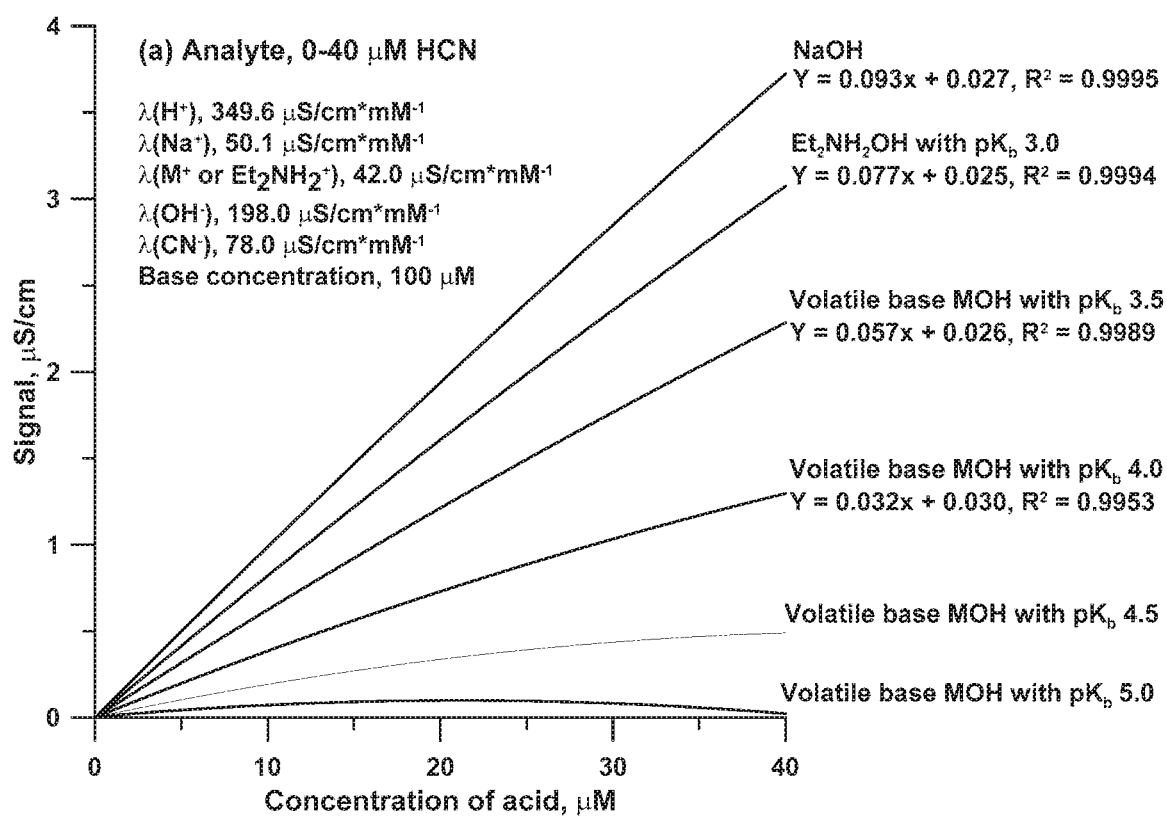

FIG. 21A is a graph showing the response (there are negative signals from baseline) of various concentrations of a very weak acid (HCN).

Figure 21B:
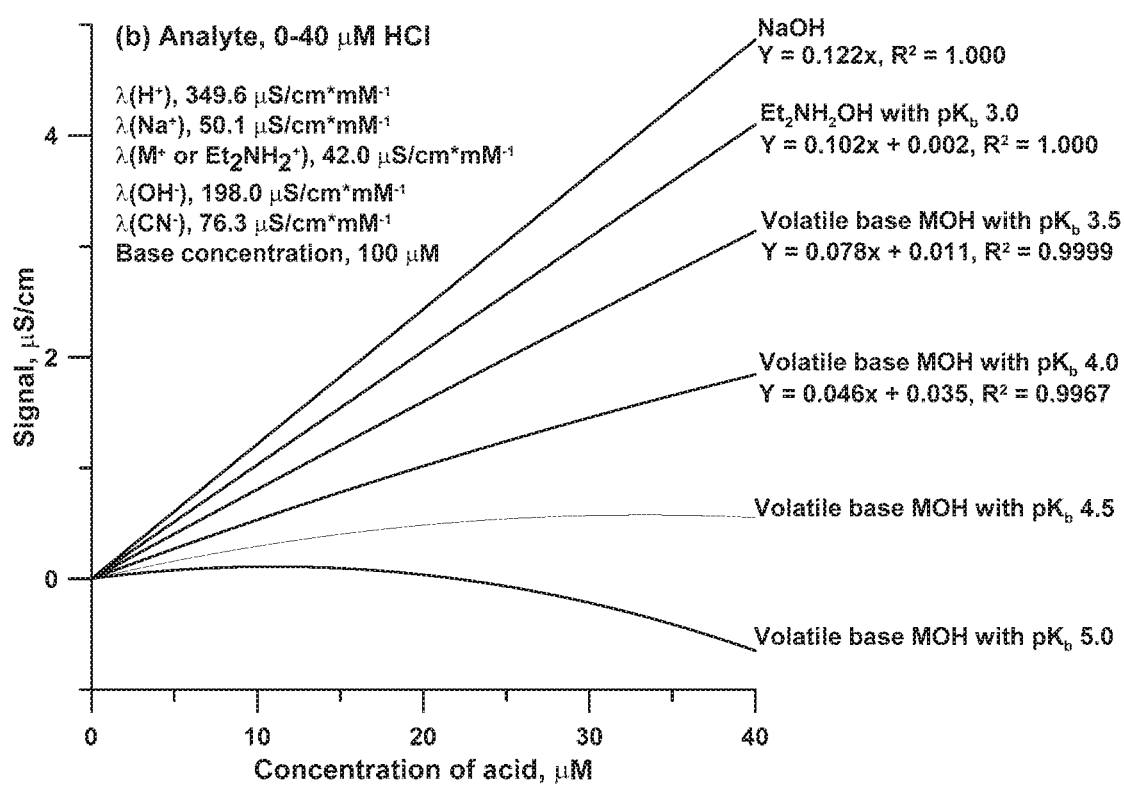

FIG. 21B is a graph showing very strong acid (HCl) responses in a background of 100 µM of a base that varies in basicity from being a strong base ($pK_b<0$) to a base with $pK_b=5$ (close to ammonia, $pK_b$ 4.76).

Figure 22:
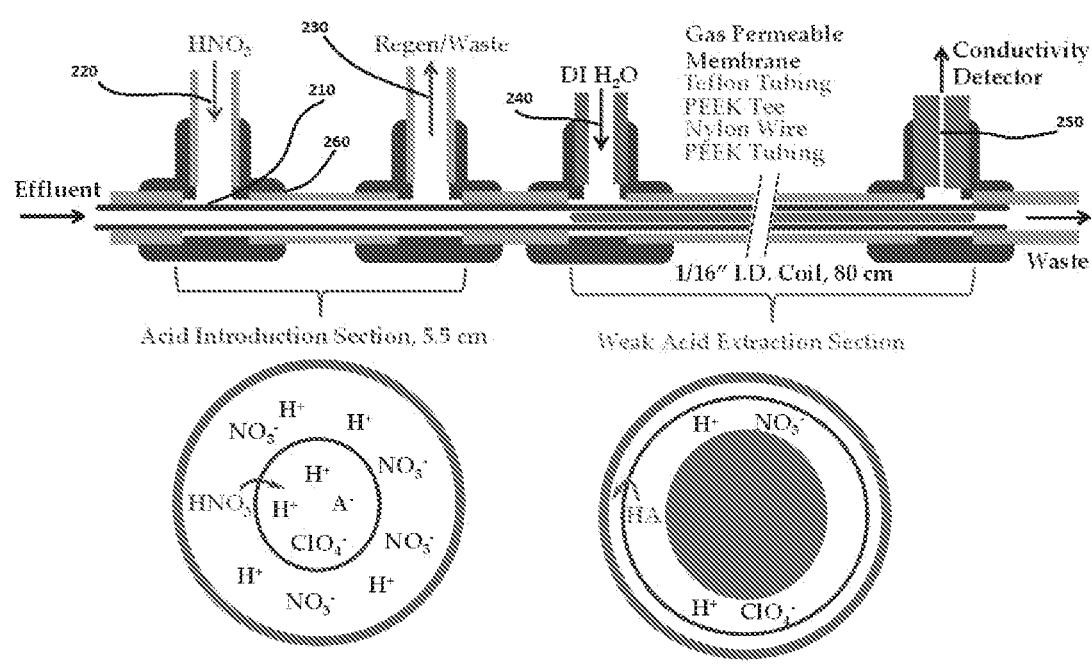

FIG. 22 is a diagram showing an embodiment in which an acid, e.g., $HNO_3$ is used to permeate the membrane to protonate a weak acid analyte. The analyte then flows downstream to a different section of the tubing to permeate out of the tubing and be detected (e.g., with a conductivity detector).

Like reference numerals refer to corresponding parts throughout the several views of the drawings.

DETAILED DESCRIPTION OF EMBODIMENTS

Introduction

The system of the present invention is useful for determining a large number of ionic species. The invention provides devices, systems and methods for separating and detecting weakly acidic or weakly basic analytes of interest. The species to be determined are salts of the acidic or basic analytes. Suitable samples include surface waters, and other liquids such as industrial chemical waste, body fluids, beverages, and drinking water. The device of the invention does not require electrical current sources or constant flow pumps; the device is simple to build and use.

Abbreviations

PAID refers to a permeative amine or acid introduction device", which is a device of the invention. As will be understood, the device of the invention is equally applicable to a format in which it is a permeative acid introduction device.

Definitions

When the term "ionic species" is used, it includes species in ionic form and components of molecules which are ionized under the conditions of the present invention.

The term "capillary scale" is defined to encompass narrow bore capillary tubing as generally used in chemical analysis but is not limited to such capillary tubing. Instead, the term "capillary tubing" broadly includes tubing having the dimensions on the order of magnitude of the internal dimensions of prior art capillary tubing. Such capillaries typically have a bore diameter ranging from about 5 to about 1,000 microns, more preferably from about 10 to about 500 microns. Such dimensions optionally apply to the permeative membrane device of the invention, the separator column or suppressor tubing. One or more segments of capillary tubes may be joined to form continuous capillary tubing. The capillary tubing leads to capillary flow rates, e.g., from about 0.1 to about 50 µL/min.

A "weakly dissociated acid" is an acid analyte with a $pK_a$ of from about 5 to about 10.

A "weakly dissociated base" is a base analyte with a $pK_b$ of from about 5 to about 10.

A "volatile acid" or a "volatile base" refers to the respective species in vapor, neat liquid or solution form.

A "permeable membrane" refers to a membrane at least partially permeable to an ion, a gas, an acid and/or a base. The membrane can be of any useful configuration, including flat, tubular, multi-annular, etc. Exemplary permeable membranes include Teflon AF, and ion exchange membranes. The permeable membrane can be a gas permeable and liquid impermeable membrane (at a given pressure).

An "eluite" refers to a chromatographic solute or analyte.

Exemplary Embodiments

The present invention provides a solution to a problem long recognized but previously unsolved in the field of ion exchange chromatography, the separation and detection of weakly dissociating acids and bases. The invention provides a device and method for introducing a volatile acid or base into an eluent stream containing the analyte of interest. The volatile acid or base effects dissociation of the analyte of interest, a base or acid, respectively. The dissociated analyte is detectable against a low background of the volatile acid or base. In various embodiments, the dissociated analyte of interest is detected using a conductivity detector.

In an exemplary embodiment, the invention provides a device for forming a salt of a weakly dissociating acid or base following a chromatographic separation of a mixture containing the acid or base by passage of said mixture through a chromatographic medium. An exemplary device is configured for integration into a chromatographic system downstream of the chromatographic medium and comprises a permeable membrane immersed in a solution of a volatile base or acid. The permeable membrane allows the passage of the volatile base or acid from the solution into a lumen of the permeable membrane where it contacts a flowing effluent from the chromatographic column, converting either weakly ionized acids or weakly ionized bases to the corresponding salts of the volatile bases or volatile acids.

An exemplary device of the invention includes a hollow membrane, which is essentially impermeable to the analyte of interest in its dissociated form, and which is permeable to the volatile acid or base. An exemplary device includes a hollow permeable membrane in which the eluent stream flows through the lumen of the hollow membrane. The membrane is in contact with the volatile acid or base. The acid or base permeates the membrane, entering the lumen and contacting the analyte of interest, dissociating the analyte of interest, thereby forming a salt. The salt form of the analyte of interest is detectable.

In an exemplary embodiment, a volatile acid or base is introduced into the eluite stream. The permeative acid/base introduction device includes a narrow bore membrane tube, which is permeable to the volatile acid or base, e.g., Teflon AF. Teflon AF is an amorphous fluoroplastics commercially available from Dupont. The acid or base permeable membrane tube is immersed in the volatile acid/amine or placed in close vicinity to a solution of this volatile component. The SCAC effluent flows through the lumen of the permeable membrane. Diethylamine (DEA) is chosen as the amine reagent, for its low $pK_b$ (3.0) and high vapor pressure. The salt converter system and method of the invention provide advantages based on the low levels of acid or base introduction into the effluent. In an exemplary embodiment where the regenerant is not electrolytically regenerated, the permeative device does not require an electrical current source or constant flow pump.

In some embodiments, the acid or base permeable membrane may include, but is not limited to Nafion® comprising of hydrophilic groups that are scattered throughout the membrane or can have an asymmetric core comprising of polypropylene or polyethylene with a thin layer of hydrophilic coating on top such as Nafion® coated on top of a porous polypropylene layer. The coating is preferably pinhole free thereby making the membrane impermeable to bulk liquid flow. In some embodiments, the acid or base permeable membrane may include polytetrafluoroethylene (PTFE). The acid or base permeable membrane may additionally include a radiation grafted polyvinyl acetate membrane on polyethylene substrate which is hydrolyzed to yield a hydrophilic hydroxide containing membrane. Alternatively, the acid or base permeable membrane may also be prepared from mixtures of polyvinylidene fluoride and polyvinyl acetate. In other embodiments, the acid or base permeable membrane may be neutral monofunctional monomers which is polymerized, including, but not limited to hydroxy- and alkoxyalkyl acrylates, such as, for example, 2-hydroxyethyl acrylate, 2-hydroxyethyl methacrylate, hydroxypropyl acrylate, hydroxypropyl methacrylate, 2-methoxyethyl acrylate, 2-phenoxyethyl acrylate, 2-phenoxyethyl methacrylate, and ethers such as glycidyl ethers such as 1.4 Butanediol diglycidyl ether, allyl glycidyl ether, and combinations thereof.

In an exemplary embodiment, the membrane is within the lumen of an outer jacket, and the volatile acid or the volatile base is in an annulus formed by an outer surface of the membrane and an inner surface of said outer jacket. The volatile base or volatile acid can be flowing or static. As per the present invention the volatile acid or base may be a fluid which is contact with one side of the membrane where as the SCAC effluent flows on the other side. Thus the membrane can be of a tubular or flat configuration.

Another embodiment of the invention comprises a system for performing the above methods including (a) a chromatographic separator having an inlet and an outlet for separating said analyte ions in the presence of an eluent comprising electrolyte counterions of opposite charge to said analyte ions, (b) a suppressor, and (c) a permeant membrane device of the invention utilizing a volatile acid or base.

In an exemplary embodiment, the device of the invention is incorporated into an ion chromatography system for the separation and detection of weakly acidic or weakly basic analytes. Ion chromatography is a known technique for the analysis of ions which typically includes a chromatographic separation stage using an eluent containing an electrolyte, and an eluent suppression stage, followed by detection, typically by an electrical conductivity detector. In the chromatographic separation stage, ions of an injected sample are eluted through a separation column using an electrolyte as the eluent. In the suppression stage, electrical conductivity of the electrolyte is suppressed but not that of the separated ions (if derived from strong acids/bases) so that the latter may be determined by a conductivity cell. This technique is described in detail in U.S. Pat. Nos. 3,897,213; 3,920,397; 3,925,019; and 3,926,559.

Figure 1:
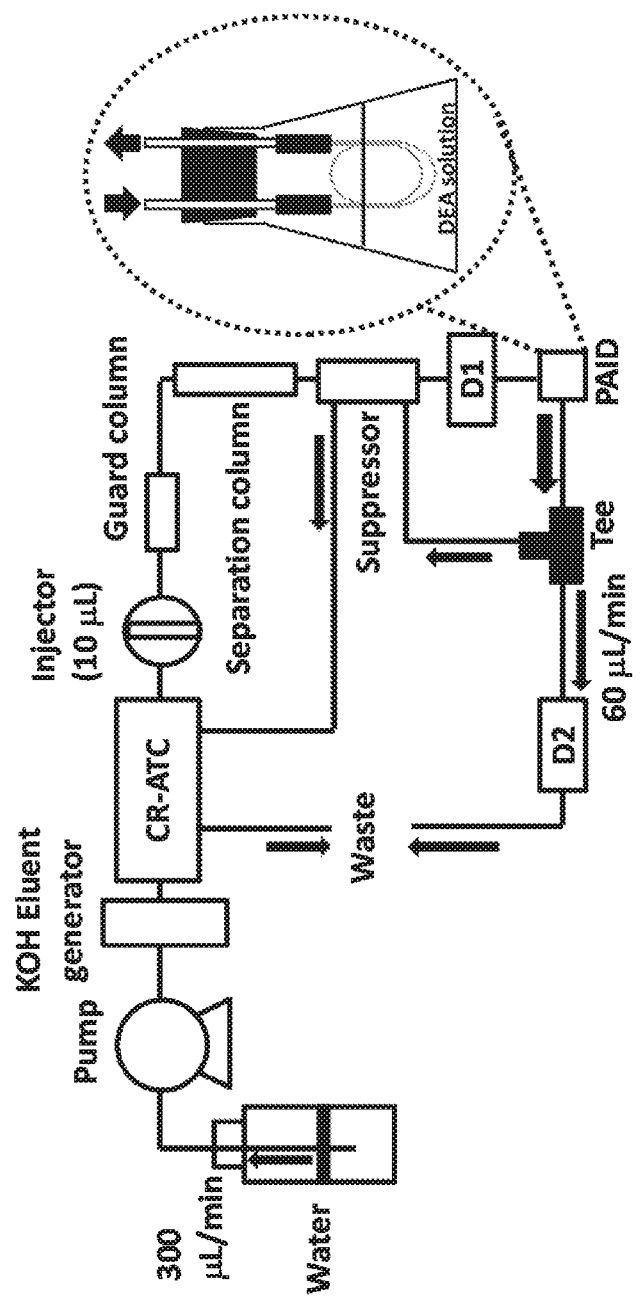
FIG. 1 is a configuration of a device of the invention shown schematically. CR-ATC, continuously regenerated anion trap column; PAID, permeative amine introduction device; D1, the first conductivity detector; D2, the second conductivity detector, which is in capillary scale; Tee, thread 10-32 and bore size 0.50 mm.

FIG. 1 shows an exemplary configuration of a device and a system of the invention incorporating the device. Upstream of the injector, the system includes a source of water, a KOH eluent generator, and a pump to move water and the eluent through the system. This exemplary device includes a continuously regenerated ion trap column (CR-ATC). The CR-ATC removes potential impurities generated by the eluent generator and is commercially available from Thermo Fisher Scientific (Dionex, Sunnyvale, Calif.). Downstream of the injector, the system includes a guard column connected to a separation column. The separation column feeds into a suppressor. Effluent leaving the suppressor passes into a first detector, e.g., a conductivity detector. After passing through the first detector, the effluent passes through a permeative amine or acid introduction device (PAID) of the invention in which weakly dissociating acid analytes of interest are converted to their corresponding salt form by a volatile base or acid permeating through the membrane of the PAID into the suppressed effluent stream. The effluent exiting the PAID passes through one arm of the Tee and enters a detector, e.g., a conductivity detector, where it is detected. Effluent exiting the PAID is optionally routed through the other arm of the Tee and into the regenerant channel of the suppressor. As will be appreciated, the effluent can be routed to both the detector and the regenerant channel of the suppressor simultaneously or sequentially.

Figure 7:
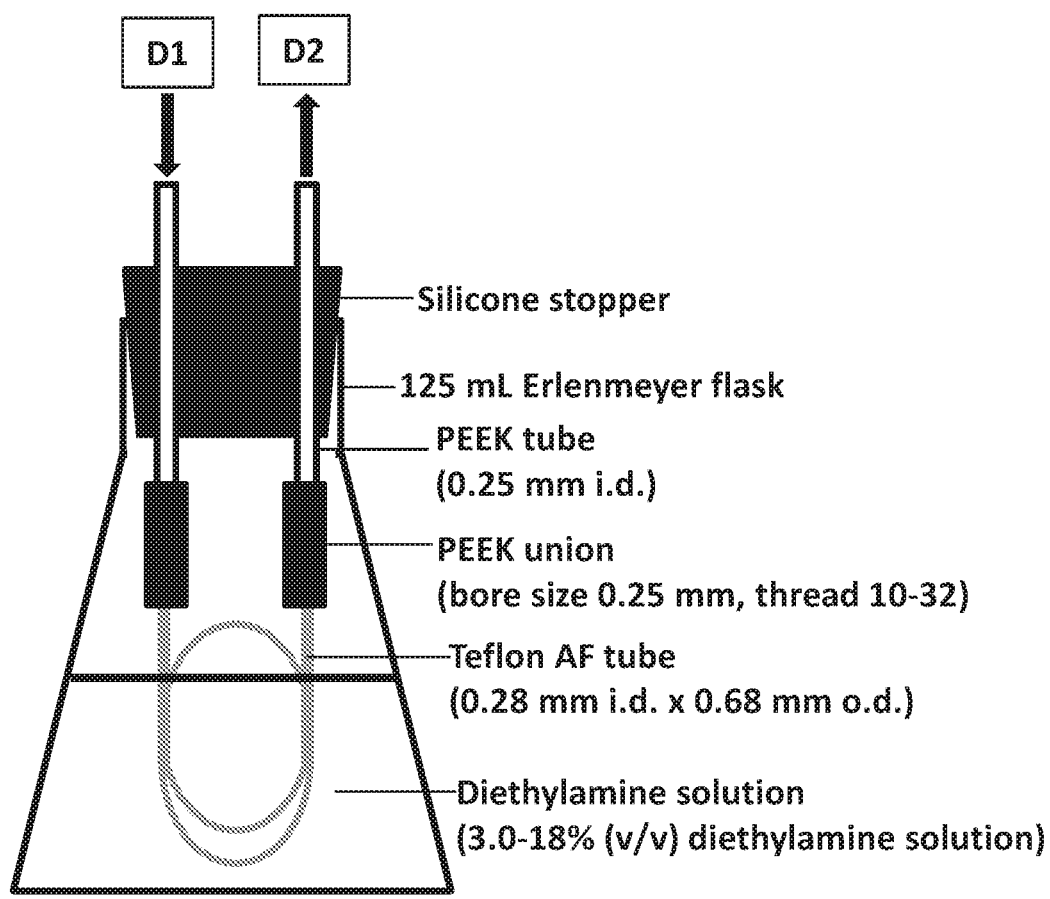
FIG. 7 illustrates the design of a Permeative Amine Introduction Device (PAID). The connecting inlet and outlet PEEK tubes are 18 and 10 cm long, respectively. In another format, the Teflon AF tube was coiled on a 4 mm support rod, thermoset by maintaining at 100° C. for 30 min and then the resulting coil used in the PAID.

A representative PAID device is shown in the expanded portion of FIG. 1 and in FIG. 7. The effluent for the suppressor flows into the lumen of the permeable membrane of the PAID device. At least a portion of the permeable membrane is maintained in a solution of a volatile base. An exemplary base is a dialkylamine, e.g., diethylamine.

Those of skill in the art will appreciate that the device, system and method set forth in reference to FIG. 1 is equally applicable to the detection of weakly ionizable bases after appropriate chromatographic separation. In this embodiment, the permeable membrane device of the invention is maintained in a solution of a volatile acid. The volatile acid crosses the permeable membrane contacting the analyte of interest, converting it to its salt form.

In an exemplary embodiment, one or more component of the system of FIG. 1 is in capillary scale. For example, the separation column can be in capillary scale. Recently, capillary high performance liquid chromatography using separation columns with internal diameters of 1 mm or smaller has gained increasing popularity as an analytical separation tool because of the advantages associated with the miniaturization of separation processes. The typical separation columns in ion chromatography have column internal diameters ranging 2 mm to 4 mm and are operated in flow rate ranging from 0.2 to 3 mL/min. The practice of ion chromatography in the capillary format (i.e., using small bore columns with internal diameters of about 1 mm or smaller) potentially has a number of advantages for analysis of ionic analytes. The use of capillary separation column can improve the separation efficiency and/or speed. Separation processes in the capillary format require much smaller amount of sample and thus offer improved compatibility with applications where amount of sample is limited. Capillary ion chromatography system typically operates at 1 to 20 μL/min and thus the amount of eluent consumed is very small. Capillary ion chromatography has improved capability for continuous operation with minimal intervention and thus minimizes problems associated with system start-up and shutdown. The operation of capillary ion chromatography at low flow rates improves the system compatibility with mass spectrometry. In addition, the practice of ion chromatography in the capillary format opens the door for the possibilities of offering new selectivity for difficult applications using new columns packed with more exotic and difficult-to-make stationary phases or exotic eluents because so little is used.

In an exemplary embodiment, one or both detectors shown in FIG. 1 (D1, D2) are in capillary scale.

FIG. 22 shows an embodiment of the invention in which the permeable membrane device 200 of the invention is divided into two zones, an acid introduction section and a weak acid extraction section. In the acid introduction section, a strong acid, e.g., $HNO_3$, is introduced to a surface of the membrane 210 via an acid inlet/introduction port 220. The acid permeates the membrane 210 and contacts the weakly dissociating acid within the internal compartment of the membrane 210. Excess acid exits through an acid waste port 230. The acid may also be directly added rather than through the membrane 210. The weakly dissociating acid traverses the length of the acid introduction section, entering the weak acid extraction section. Deionized water is introduced into the weak acid extraction section via a water introduction port 240. The water contacts a surface of the membrane 210, extracting the protonated weakly dissociating acid and carrying it out of the permeable membrane device 200 and to a detector, e.g., a conductivity detector.

In some embodiments, the permeable membrane device 200 of may be divided into two zones, a base introduction section and a weak base extraction section. In these embodiments, in the base introduction section, a strong base is introduced to a surface of the membrane 210 via a base inlet/introduction port similar to the acid inlet/introduction port 220. The base permeates the membrane 210 and contacts the weakly dissociating base within the internal compartment of the membrane 210. The base may also be directly added rather than through the membrane 210. The weakly dissociating base traverses the length of the base introduction section, entering the weak base extraction section. Deionized water is introduced into the weak base extraction section via a water introduction port, e.g. 240. The water contacts a surface of the membrane 210, extracting the deprotonated weakly dissociating base and carrying it out of the permeable membrane device 200 and to a detector, e.g., a conductivity detector.

In an exemplary embodiment, the permeable membrane 210 is disposed within a component formed of a material that is essentially impermeable to the liquid components of the assay. The impermeable outer component 260 includes an acid introduction section characterized by an acid inlet port 220 and an acid outlet/waste port 230. The outer impermeable component 260 also includes a weakly dissociating acid extraction section contiguous with the acid introduction section, which is configured with a water inlet/introduction port 240 and a weakly dissociating acid outlet port 250. In an exemplary embodiment, the weakly dissociating acid outlet port 250 is plumbed to a detector, e.g. a conductivity detector. The permeable membrane 210 is fitting within the annulus (or other cavity) of the impermeable component 260 with these two components spaced such that fluid, e.g., acid and water, is able to flow between the outer surface of the permeable membrane 210 and the inner surface of the impermeable component 260.

Exemplary systems of the invention include a suppressor, which can be of any format useful or standard in ion chromatography. Suppressed ion chromatography is a known technique for the analysis of ions. Suppression or stripping of the electrolyte is described in U.S. Pat. Nos. 3,897,213; 3,920,397; 3,925,019; and 3,926,559 by an ion exchange resin bed. A different form of suppressor column is described and published in U.S. Pat. No. 4,474,664, in which a charged ion exchange membrane in the form of a fiber or sheet is used in place of the resin bed. In this form of suppressor, the sample and eluent are passed on one side of the membrane with a flowing regenerant on the other side, the membrane partitioning the regenerant from the effluent of chromatographic separation. The membrane passes ions of the same charge as the exchangeable ions of the membrane to convert the electrolyte of the eluent to weakly ionized form, followed by detection of the ions.

Another membrane suppressor device is disclosed in U.S. Pat. No. 4,751,004. There, a hollow fiber suppressor is packed with polymer beads to reduce band spreading. There is a suggestion that such packing may be used with other membrane forms. Furthermore, there is a suggestion that the function of the fiber suppressor is improved by using ion exchange packing beads. No theory is set forth as to why such particles would function in an improved manner.

Another suppression system is disclosed in U.S. Pat. No. 4,459,357. There, the effluent from a chromatographic column is passed through an open flow channel defined by flat membranes on both sides of the channel. On the opposite sides of both membranes are open channels through which regenerant solution is passed. As with the fiber suppressor, the flat membranes pass ions of the same charge as the exchangeable ions of the membrane. An electric field is passed between electrodes on opposite sides of the effluent channel to increase the mobility of the ion exchange. One problem with this electrodialytic membrane suppressor system is that very high voltages (50-500 volts DC) are required. As the liquid stream becomes deionized, electrical resistance increases, resulting in substantial heat production. Such heat is detrimental to effective detection because it greatly increases noise and decreases sensitivity.

In U.S. Pat. No. 4,403,039, another form of electrodialytic suppressor is disclosed in which the ion exchange membranes are in the form of concentric tubes. One of the electrodes is at the center of the innermost tube. One problem with this form of suppressor is limited exchange capacity. Although the electrical field enhances ion mobility, the device is still dependent on diffusion of ions in the bulk solution to the membrane. See also U.S. Pat. Nos. 4,500,430 and 4,647,380.

Another form of suppressor is described in U.S. Pat. No. 4,999,098. In this apparatus, the suppressor includes at least one regenerant compartment and one chromatographic effluent compartment separated by an ion exchange membrane sheet. The sheet allows transmembrane passage of ions of the same charge as its exchangeable ions. Ion exchange screens are used in the regenerant and effluent compartments. Flow from the effluent compartment is directed to a detector, such as an electrical conductivity detector, for detecting the resolved ionic species. The screens provide ion exchange sites and serve to provide site-to-site transfer paths across the effluent flow channel so that suppression capacity is no longer limited by diffusion of ions in the bulk solution to the membrane. A sandwich suppressor is also disclosed including a second membrane sheet opposite to the first membrane sheet and defining a second regenerant compartment. Spaced electrodes are disclosed in communication with both regenerant chambers along the length of the suppressor. By applying an electrical potential across the electrodes, there is an increase in the suppression capacity of the device. The patent discloses a typical regenerant solution (acid or base) flowing in the regenerant flow channels and supplied from a regenerant delivery source. In a typical anion analysis system, sodium hydroxide is the electrolyte developing reagent and sulfuric acid is the regenerant. The patent also discloses the possibility of using water to replace the regenerant solution in the electrodialytic mode.

An exemplary system of the invention includes one or more eluent generators. U.S. Pat. Nos. 6,036,921 and 6,225,129 describe electrolytic devices useful to generate high purity acid and base solutions by using water as the carrier. Using these devices, high purity, contaminant-free acid or base solutions are automatically generated on-line for use as eluents in chromatographic separations. These devices simplify gradient separations that can now be performed using electrical current gradients with minimal delay instead of using a conventional mechanical gradient pump. An exemplary eluent generator is described in U.S. Pat. No. 8,647,576. An acid or base is generated in an aqueous solution by the steps of: (a) providing a source of first ions adjacent an aqueous liquid in a first acid or base generation zone, separated by a first barrier (e.g., anion exchange membrane) substantially preventing liquid flow and transporting ions only of the same charge as said first ions, (b) providing a source of second ions of opposite charge adjacent an aqueous liquid in a second acid or base generation zone, separated by a second barrier transporting ions only of the same charge as the second ions, and (c) transporting ions across the first barrier by applying an electrical potential through said first and second zones to generate an acid-containing aqueous solution in one of said first or second zones and a base-containing aqueous solution in the other one which may be combined to form a salt.

An exemplary system of the invention includes one or more detectors. In ion chromatography, a particular detection scheme is chosen based on the properties of the analytes. For example, analysis of nitrate, bromide or iodide can be pursued by ultraviolet detection (UV) since these analytes absorb in UV. However other common ions such as fluoride, sulfate, and phosphate do not absorb UV and so will not respond to direct UV detection.

In various embodiments, the system includes one or more conductivity detectors. Conductivity detection is a bulk property detection and the total conductance depends on the nature of the ions via the charge on the ion and the mobility and the concentration in a sample. The specific conductance of a solution is the sum of the concentration-mobility product of the different ions present. It is well known that equal concentrations of specific different compounds, e.g. NaCl and HCl, have vastly different specific conductance. Conductivity however responds to all ionic solutes but cannot provide a measure of total charge.

According to the present invention, an exemplary volatile amine is an amine capable of permeating through the permeable membrane of the permeant membrane device of the invention from a solution of the volatile amine in which the membrane is in contact while an eluent stream containing one or more weakly ionizable acid flows within the annulus of the permeable membrane. Exemplary volatile amines of use in the PAID of present invention include those having a general structure according to Formula I:

in which $R^1$, $R^2$ and $R^3$ are selected from H and substituted or unsubstituted alkyl. Exemplary alkyl moieties include $C_1$, $C_2$, $C_3$, $C_4$, $C_5$, $C_6$, $C_7$, and $C_8$ straight, branched chain and cyclic substituted or unsubstituted alkyl moieties. In various embodiments, two or more of $R^1$, $R^2$ and $R^3$, together with the nitrogen to which they are bonded are joined to form a ring structure. The amines can be used individually or in combination.

Exemplary volatile amines include, without limitation, $(methyl)_n$amine, $(ethyl)_n$, $(propyl)_n$ amine, and $(butyl)_n$ amine, in which n is 1, 2, or 3; alkanolamines (including, but not necessarily limited to, monoethanolamine (MEA), methyldiethanolamine (MDEA), diethanolamine (DEA)); ethylenediamine (EDA), methoxypropylamine (MOPA), diethylaminoethanol (DEAE) and the like and mixtures thereof. Although ammonia is not strictly speaking an amine, in the context herein ammonia is included in the same group of nitrogen compounds as amines.

In various embodiments, the useful amines include relative stronger amines having a pKa between about 10.5 to about 12. In one non-limiting embodiment, the amine does not contain oxygen. In another non-restrictive embodiment, the amines are di-alkylamines which have a pKa range of between about 10.7 to about 11.4. In various embodiments, the amine has a normal boiling point less than about 95° C., e.g., less than about 70° C., less than about 50° C., or less than about 40° C. Suitable amines include, but are not limited to, dimethylamine, diethylamine, dipropylamine, di-isopropylamine, di-n-butylamine, diisobutylamine, di-sec-butylamine, di-tert-butylamine, pyrrolidine, piperidine, and combinations (e.g. mixtures) thereof.

Figure 8:
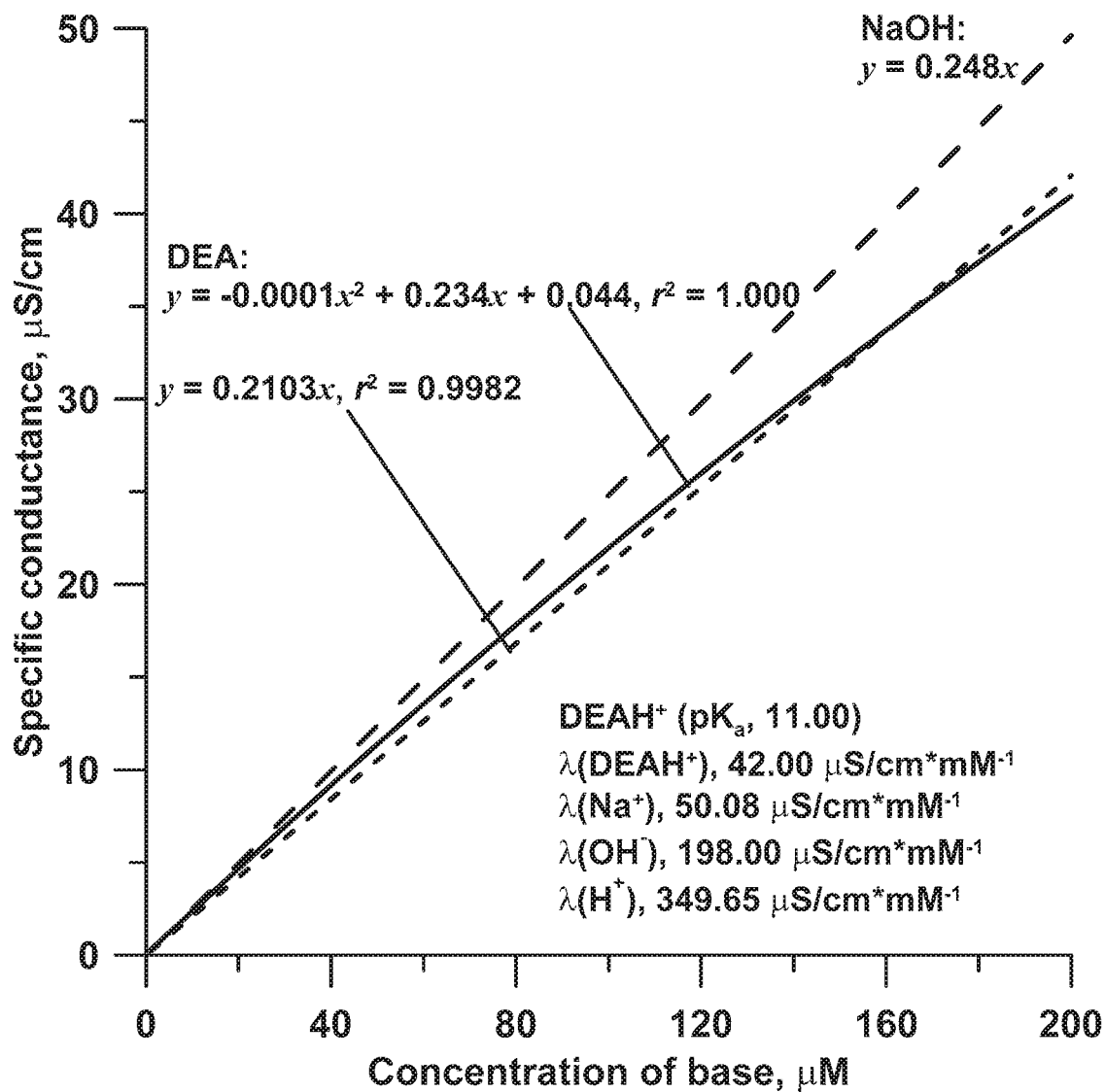
FIG. 8 is a graph illustrating theoretical specific conductance values for NaOH and diethylamine hydroxide (DEAOH) in the 0-200 µM range. For DEA, the solid line indicates the actual data as well as the best quadratic fit, while the zero intercept best linear fit is shown by the dashed line.
Figure 9:
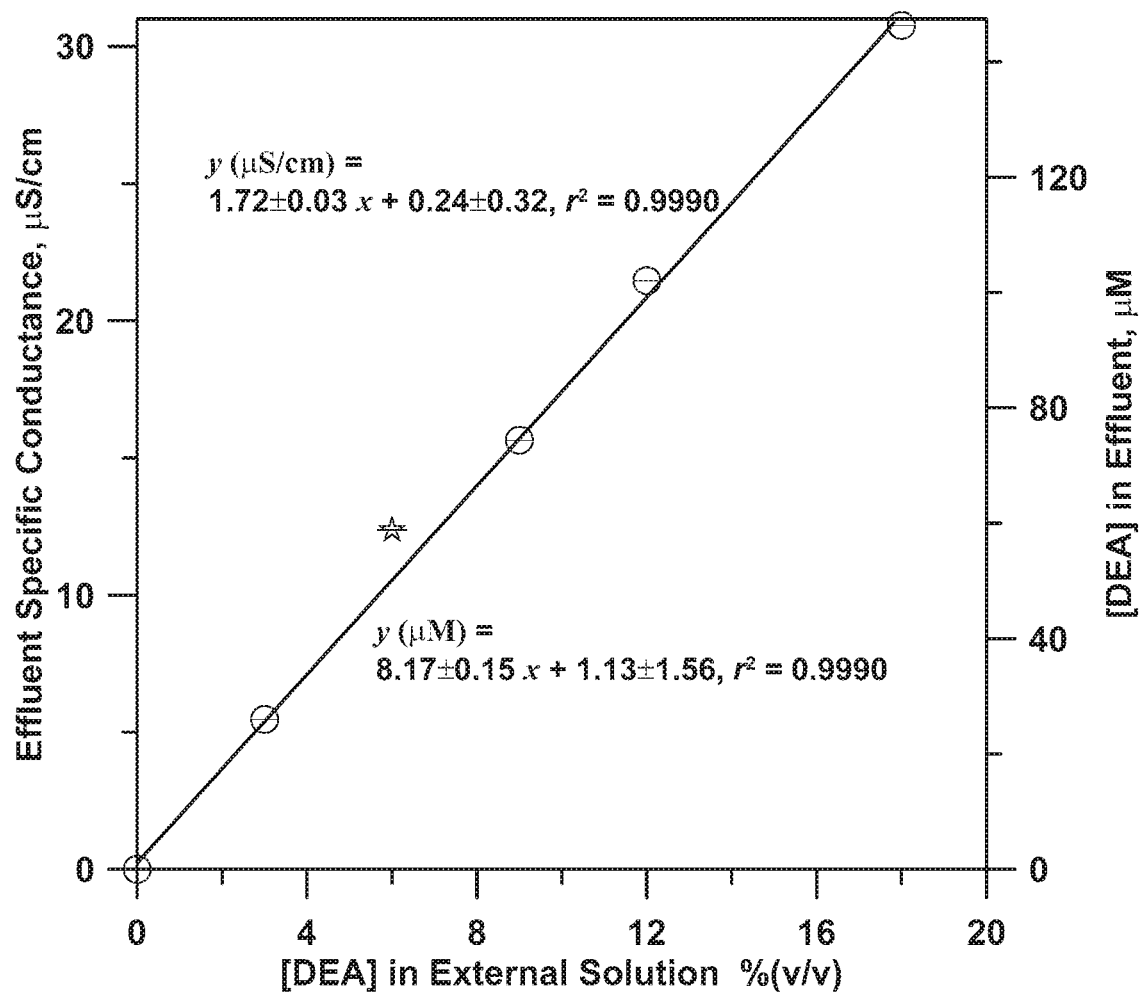
FIG. 9 is a graph illustrating the DEA concentration and specific conductance of the effluent as a function of the concentration of the external DEA solution. Water is flowing at 0.3 mL/min through a 60 cm long Teflon AF® tube (0.28 mm i.d., 0.68 mm o.d.) immersed in a DEA solution of indicated concentration. Note that the intercepts in both cases are statistically indistinguishable from zero.

Exemplary volatile amines of use in the invention have sufficiently low conductance at the concentration used such that they do not excessively interfere with detection of the analyte salts. An exemplary amine is diethyl amine. FIG. 8 is a graph illustrating theoretical specific conductance values for NaOH and DEAOH in the 0-200 μM range. For DEA, the solid line indicates the actual data as well as the best quadratic fit, while the zero intercept best linear fit is shown by the dashed line. FIG. 9 is a graph illustrating the DEA concentration and specific conductance of the effluent as a function of the concentration of the external DEA solution. Water is flowing at 0.3 mL/min through a 60 cm long Teflon AF® tube (0.28 mm i.d., 0.68 mm o.d.) immersed in a DEA solution of indicated concentration. Note that the intercepts in both cases are statistically indistinguishable from zero. The asterisked data point was not used in the best fit calculations.

The device of the invention also finds use in the separation of weak bases and the detection of their salts with volatile acids. In this embodiment, the device of the invention is configured such that the volatile acid (or a solution thereof) is external to the permeable membrane analogous to the volatile base of the PAID device.

According to the present invention, an exemplary volatile acid is an acid capable of permeating through the permeable membrane of the permeant membrane device of the invention from a solution of the volatile acid with which the membrane is in contact while an eluent stream containing one or more weakly ionizable acid flows within the annulus of the permeable membrane. Useful volatile acids include those acids which have a pKa range from <0 to about 4. Another definition of volatile acid is on that is relatively readily removed from a solution under vacuum. Exemplary volatile acids include all haloacids (e.g., HF, HCl, HBr, and HI) as well as methanesulfonic acid, toluenesulfonic acid, carboxylic acids such as formic acid, etc., and other acids that at least 99% of which can be removed under vacuum (e.g., <10 mm Hg pressure) within 24 hours.

Any useful concentration of base or acid can be incorporated into the permeable membrane device of the invention. In an exemplary embodiment, the volatile amine concentration in the permeated solution is about 100 µM or less.

In an exemplary embodiment, the invention uses a high concentration of volatile base or volatile acid external to the membrane, and the base or acid is moderately permeable through the membrane. In this manner, the desired concentration within the membrane is reached. A high external concentration of volatile base or volatile acid coupled with a modest permeability of these components across the membrane ensures that the external base or acid needs be only infrequently replenished. By "high external concentration" it is intended that the concentration of the volatile base or acid be sufficiently high so as to not require constant changing, replacement or replenishment of the volatile base or volatile acid.

An exemplary external volatile base or volatile acid concentration, assuming the device has a short length (5-75 cm) of amine introduction tubing will be sufficient to provide a concentration of the base or acid within the membrane of from ranging about 100 µM to about 200 µM, and more preferably from about 20 µM to about 100 µM. Though recited in terms of certain ranges, it will be understood that all ranges from the lowest of the lower limits to the highest of the upper limits are included, including all intermediate ranges or specific values, within this full range or any specifically recited range. It is within the ability of one of ordinary skill to select a membrane permeability (e.g., molecular weight cutoff, length, composition, thickness, etc.) and the concentration and identity of the base or acid to achieve a desired concentration of base or acid within the membrane. In an exemplary embodiment, the device is capable of prolonged use without replacement or replenishment of the volatile base or acid.

Figure 3:
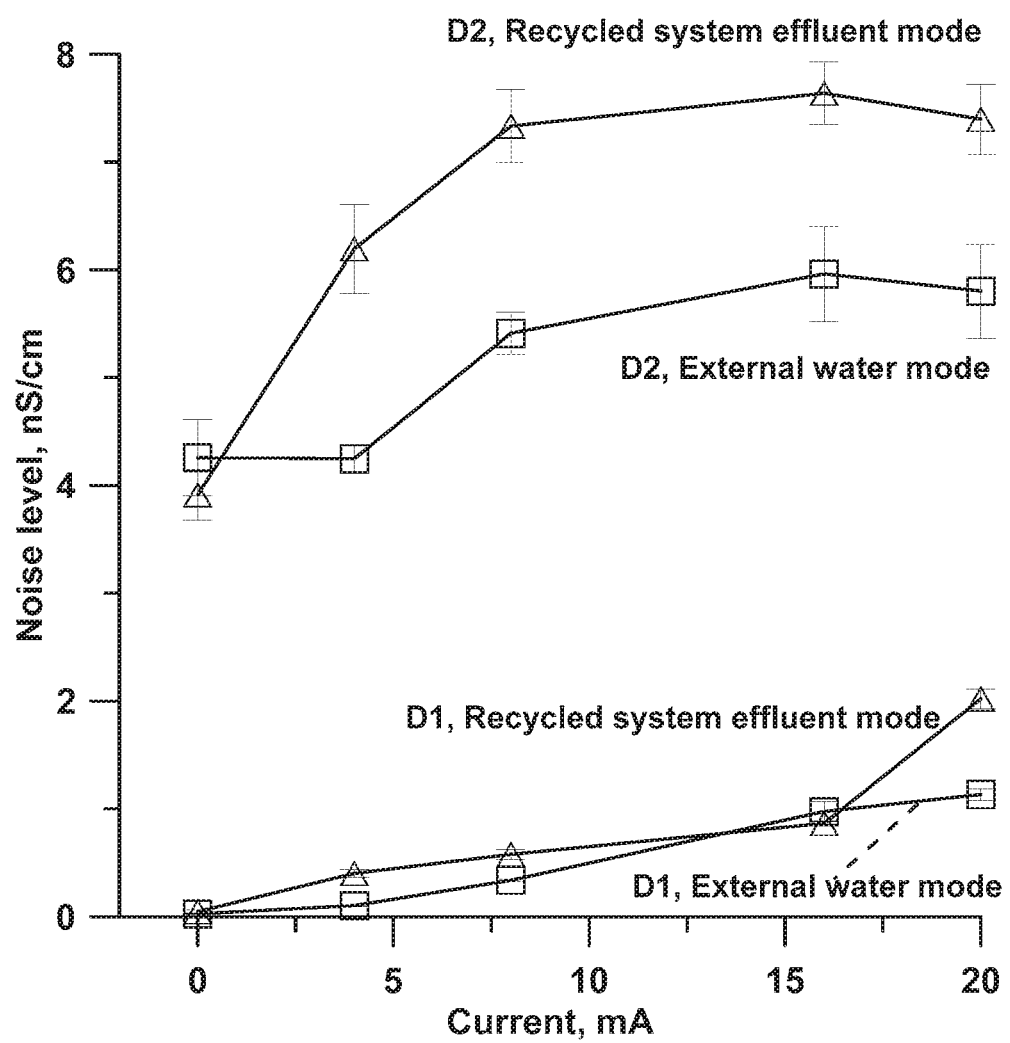
FIG. 3 is a graph illustrating the effect of current of membrane suppressor on the baseline noise at D1 and D2. The noise was computed over 2.5 min periods after subtracting baseline drift (predicted best linear fit of the data subtracted from the data). The current was increased from 0.0 mA to 20 mA with 4 mA in each step, while the KOH eluent was kept at 2.0 mM. The specific conductance background at D2 is ~31 µS/cm. In water recycled mode, the main eluent stream after PAID device was used as regenerant stream. In external water mode, a fresh DI water stream was used as the regenerant stream. The recycle mode has been used for days without an increase in noise or deterioration in suppressor or CR-ATC performance.

In various embodiments, the invention provides a system generating chromatograms with low levels of baseline noise. For example, FIG. 3 is a graph illustrating the effect of current of membrane suppressor on the baseline noise at D1 and D2. The noise was computed over 2.5 min periods after subtracting baseline drift (predicted best linear fit of the data subtracted from the data). The current was increased from 0.0 mA to 20 mA with 4 mA in each step, while the KOH eluent was kept at 2.0 mM. The specific conductance background at D2 is ~31 µS/cm. In water recycled mode, the main eluent stream after PAID device was used as regenerant stream. In external water mode, a fresh DI water stream was used as the regenerant stream. In this embodiment, the recycle mode can be used for days without an increase in noise or deterioration in suppressor or CR-ATC performance.

Figure 4:
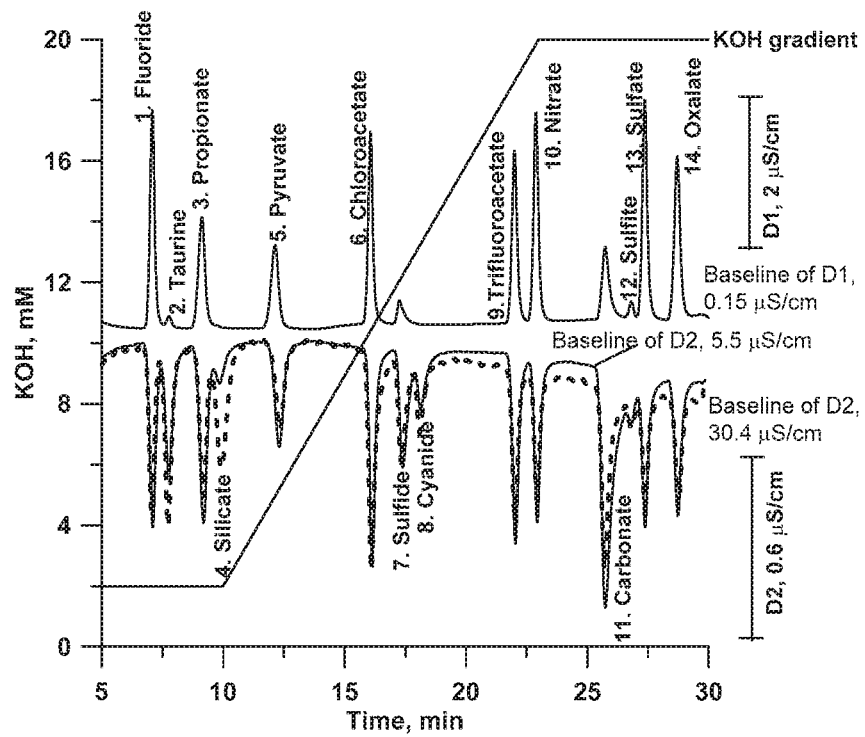
FIG. 4 is a graph illustrating an application of dual conductometric detection with the PAID. The suppressor was operated at 20 mA in the periods 0-4 and 30-36 min, and turned off during 4-30 min. 10 µL injection of 50 µeq/L for each ion. Carbonate results from $CO_2$ intrusion to sample and sulfite is an impurity in the sulfide standard. The top trace is the conventional suppressed detector response and the bottom two traces are the second detector responses at two different levels of [DEA], 27 µM and 150 µM. 2 mm AS11 column; flow rate 0.3 mL/min. The KOH gradient profile is shown with respect to the left ordinate.

In various embodiments, the invention provides a system having at least two detectors. A representative system includes two conductivity detectors. FIG. 4 illustrates an application of dual conductometric detection with the PAID. The suppressor was operated at 20 mA in the periods 0-4 and 30-36 min, and turned off during 4-30 min. 10 µL injection of 50 µeq/L for each ion. Carbonate results from $CO_2$ intrusion to sample and sulfite is an impurity in the sulfide standard. The top trace is the conventional suppressed detector response and the bottom two traces are the second detector responses (Post-PAID) at two different levels of [DEA], 27 µM and 150 µM. 2 mm AS11 column; flow rate 0.3 mL/min. The KOH gradient profile is shown with respect to the left ordinate.

A sample dual conductometric chromatogram is shown in FIG. 19. Dual detection was effected using 1.0 mL sample injection. Sample injection time, 0.0 min; sample loading time, 32.5 min; current of suppressor, 0 mA from 6-32.5 min and 20 mA in the rest of time. 1.0 mL injection of 1.0 µeq/L for each ion. Carbonate results from $CO_2$ intrusion to sample. Sulfite is an impurity in the sulfide standard used. Formate impurity comes from both cyanide standard and formate intrusion in air to sample.

Figure 5:
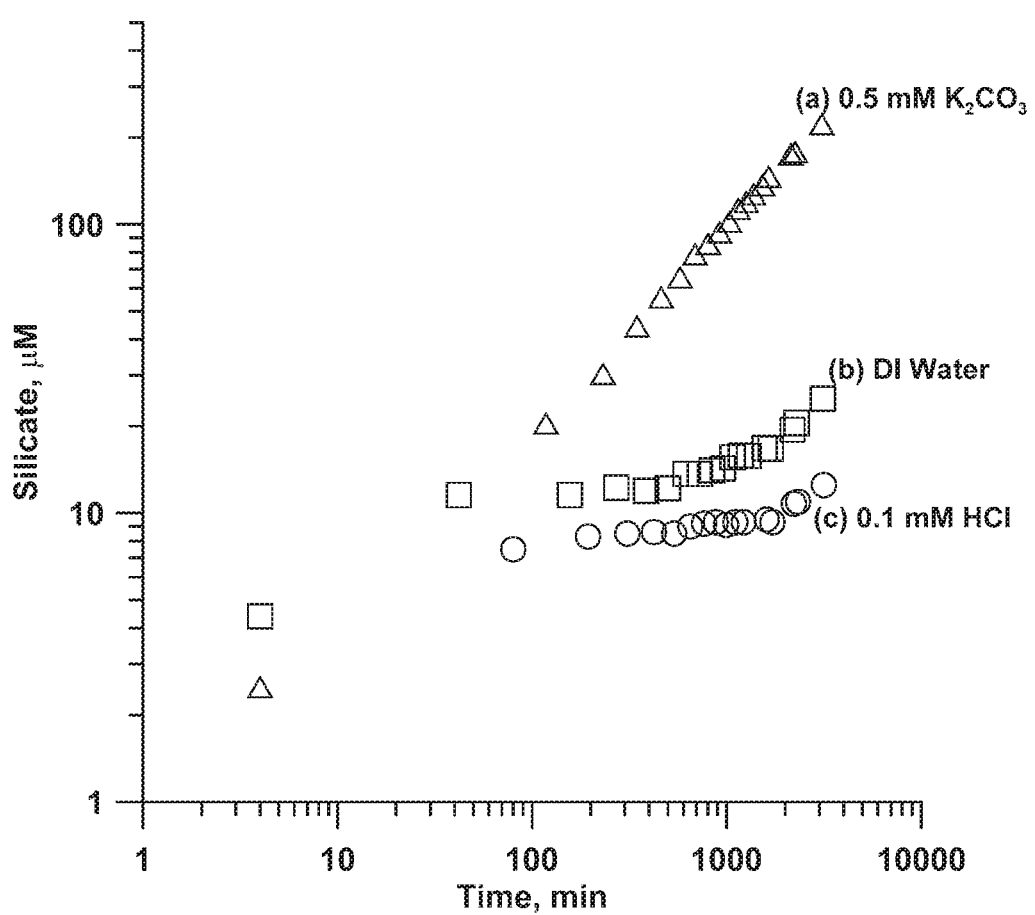
FIG. 5 is a graph illustrating a temporal appearance of silicate in a borosilicate glass sample vial containing (a) mildly alkaline solution, (b) DI water and (c) a slightly acidic solution. Only (a) contained an initially detectable concentration of silicate. Samples were transferred at desired times to polystyrene sample vials. Analytical conditions same as in FIG. 4.

In various embodiments, the invention provides a device, system and method for detecting silicate in a sample. FIG. 5 is a graph illustrating a temporal appearance of silicate in a borosilicate glass sample vial containing (a) mildly alkaline solution, (b) DI water and (c) a slightly acidic solution. Only (a) contained an initially detectable concentration of silicate. Analytical conditions same as in FIG. 4.

Figure 6:
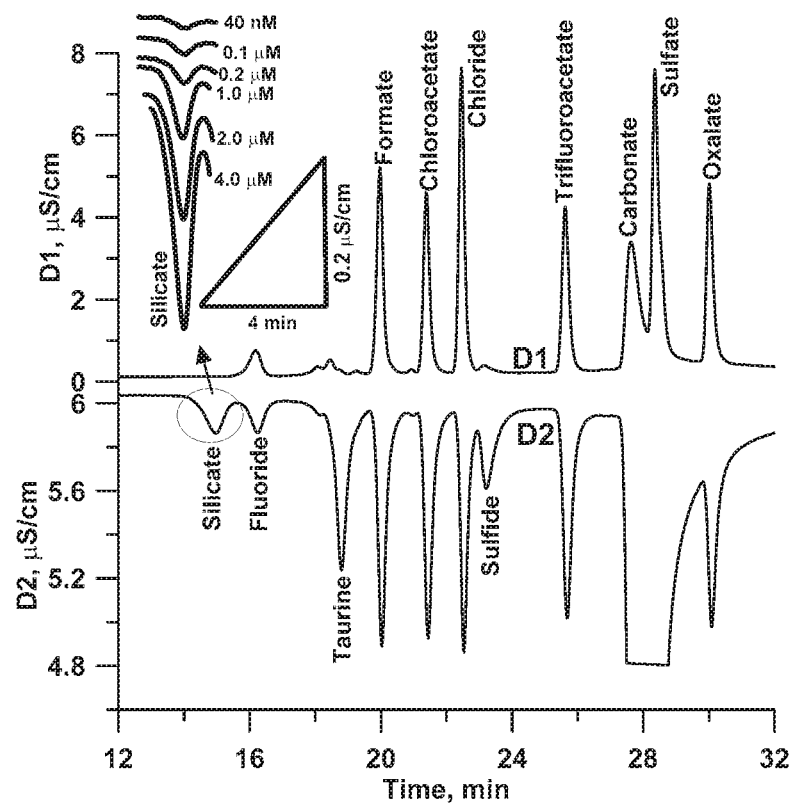
FIG. 6 is a graph illustrating dual conductometric ion chromatogram on AG24+AS24 columns using 1.0 mL sample injection. Gradient profile same as FIG. 4. Suppressor current 20 mA 0-6 and 32.5-40 min and off during 6-32.5 min. Sample concentrations (µeq/L): silicate (2.0), fluoride (0.25) and all other ions (1.0). Carbonate was not deliberately added. The separation under the given conditions on this column set was good for silicate but compromised the separation of other analytes. Pyruvate, cyanide and nitrate co-eluted with formate, sulfide, and sulfate, respectively, and were not present in this sample.

The method of the invention provides good separation of silicate from other ions. FIG. 6 is a graph illustrating dual conductometric ion chromatogram on AG24+AS24 columns (anion exchange guard column and analytical column that are commercially available from Thermo Fisher Scientific, Dionex, Sunnyvale, Calif., U.S.A.) using 1.0 mL sample injection.

Figure 16B:
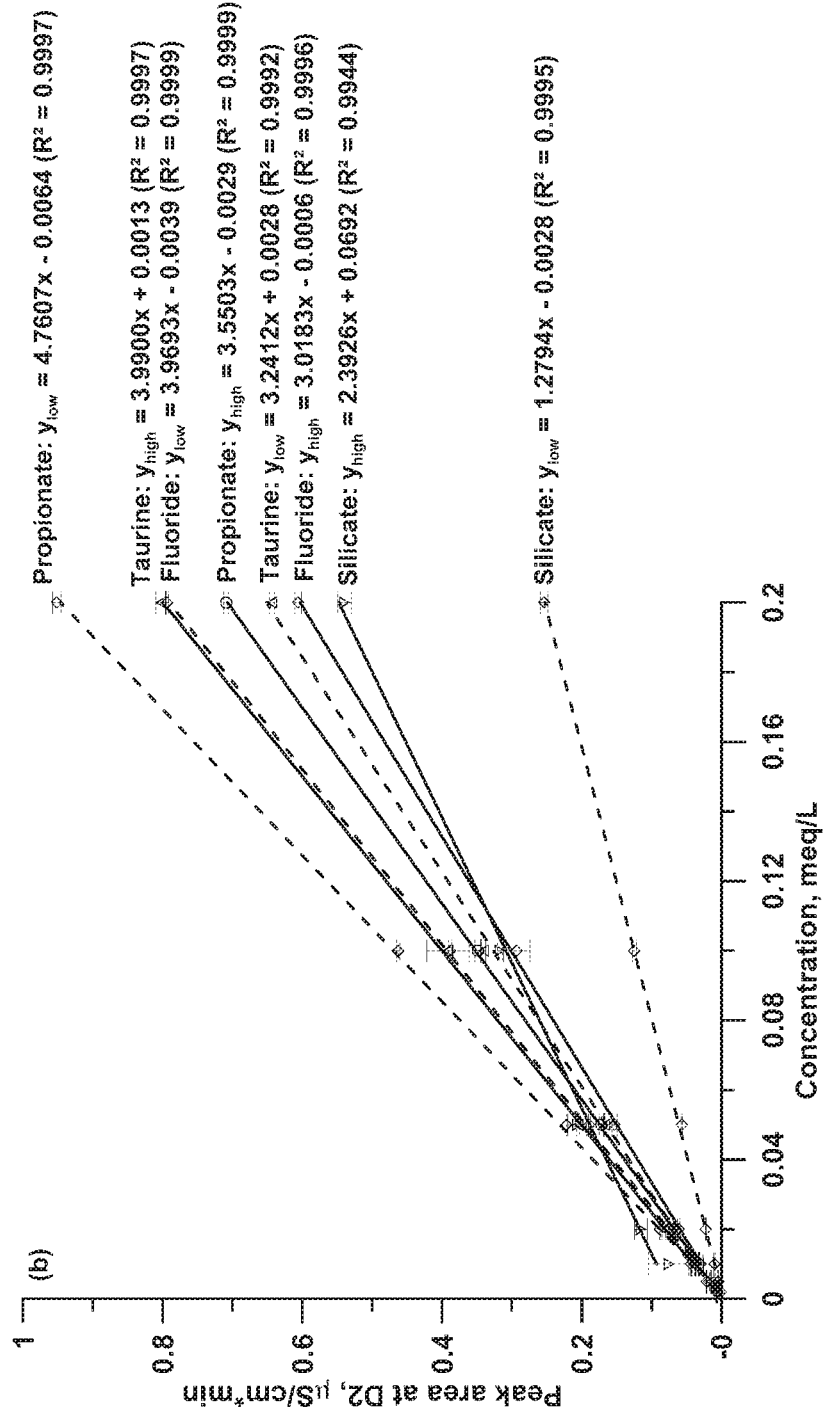
Figure 16C:
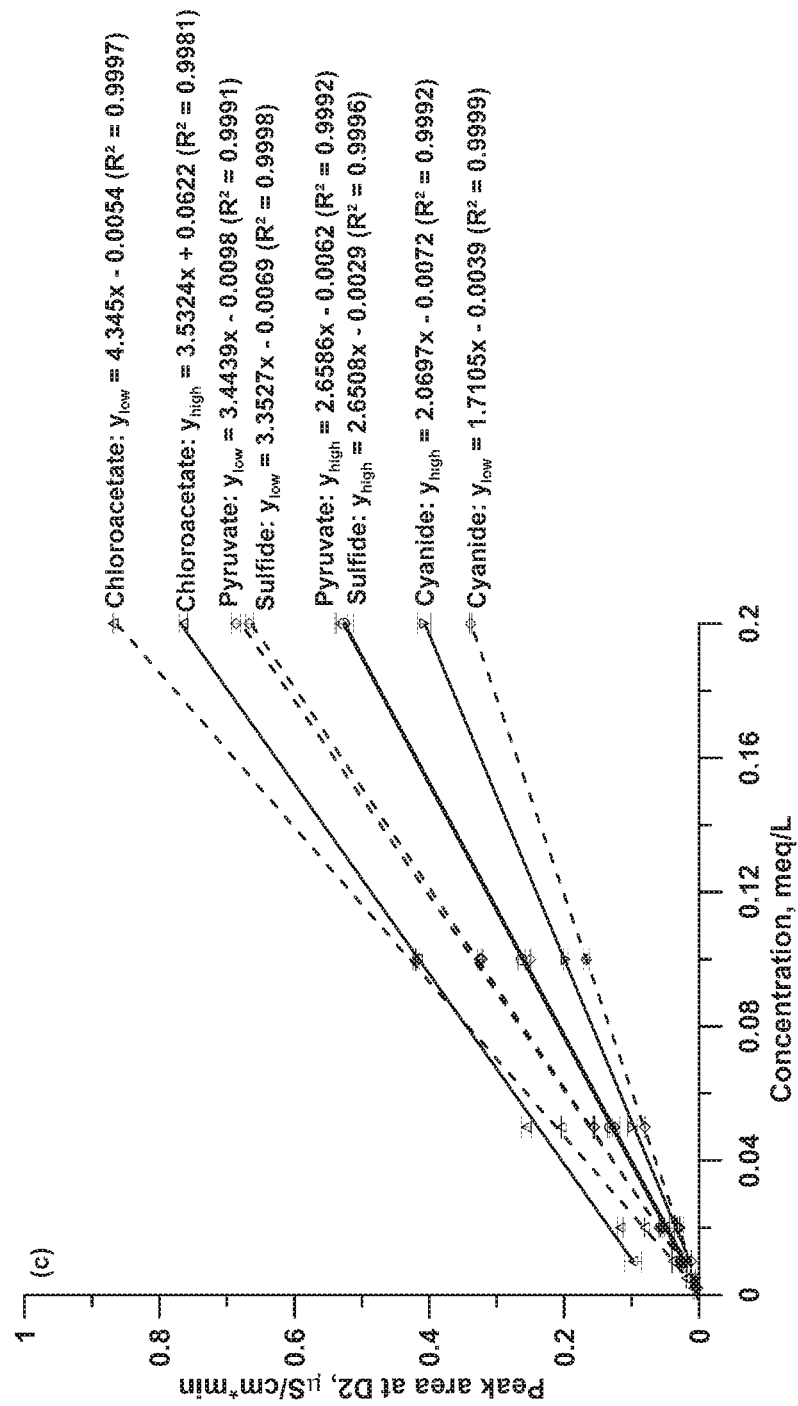
Figure 16D:
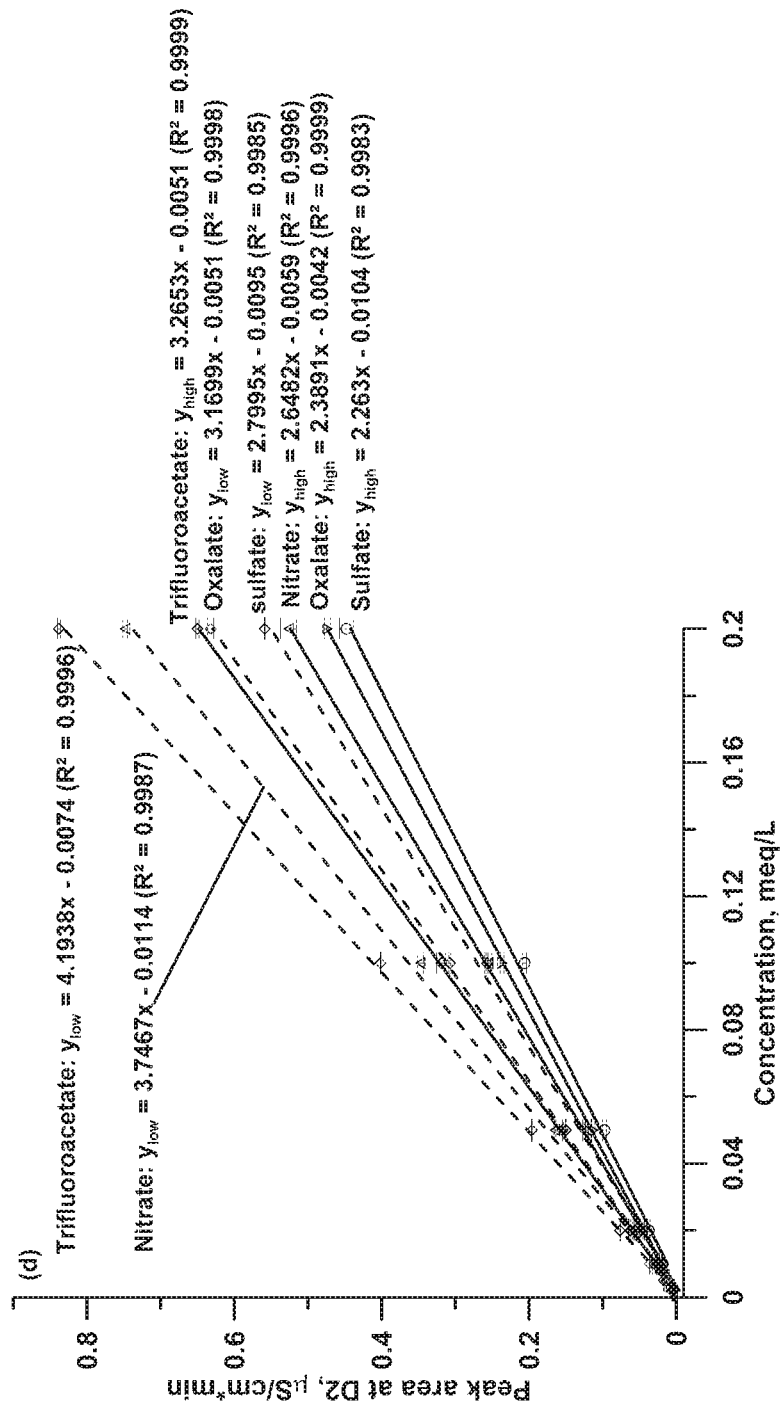

The device of the invention provides good linearity of response over a range of analyte concentrations across differing analyte structures. FIGS. 16A-16D are calibration curves relevant to FIG. 4. FIG. 16A shows calibration curves at D1, and FIGS. 16B-16D show calibration curves at D2: solid traces for 150 µM DEA (30.8 µS/cm background) and dashed traces for 27 µM DEA (background 5.5 µS/cm). Concentrations range from 2-200 µeq/L for each ion. FIGS. 17A and 17B provide LOD ratios and calibration slope ratios, and LOD ratios of various anion at D2 between using 150 µM and 27 µM [DEA]. Limits of detection are listed in Table 2. The background conductance levels are 30.8 µS/cm and 5.5 µS/cm, respectively, with corresponding baseline noise levels of 4.4 and 0.83 nS/cm, respectively. A slope ratio of unity indicates sensitivity did not change while a value<1 indicates it was lower for a lower background [DEA] (taurine, silicate, cyanide). The LOD ratios fall within a range of 0.1-0.5, corresponding to a 10-2× improvement in the LOD in going from 150 to 27 µM [DEA].

Figure 2:
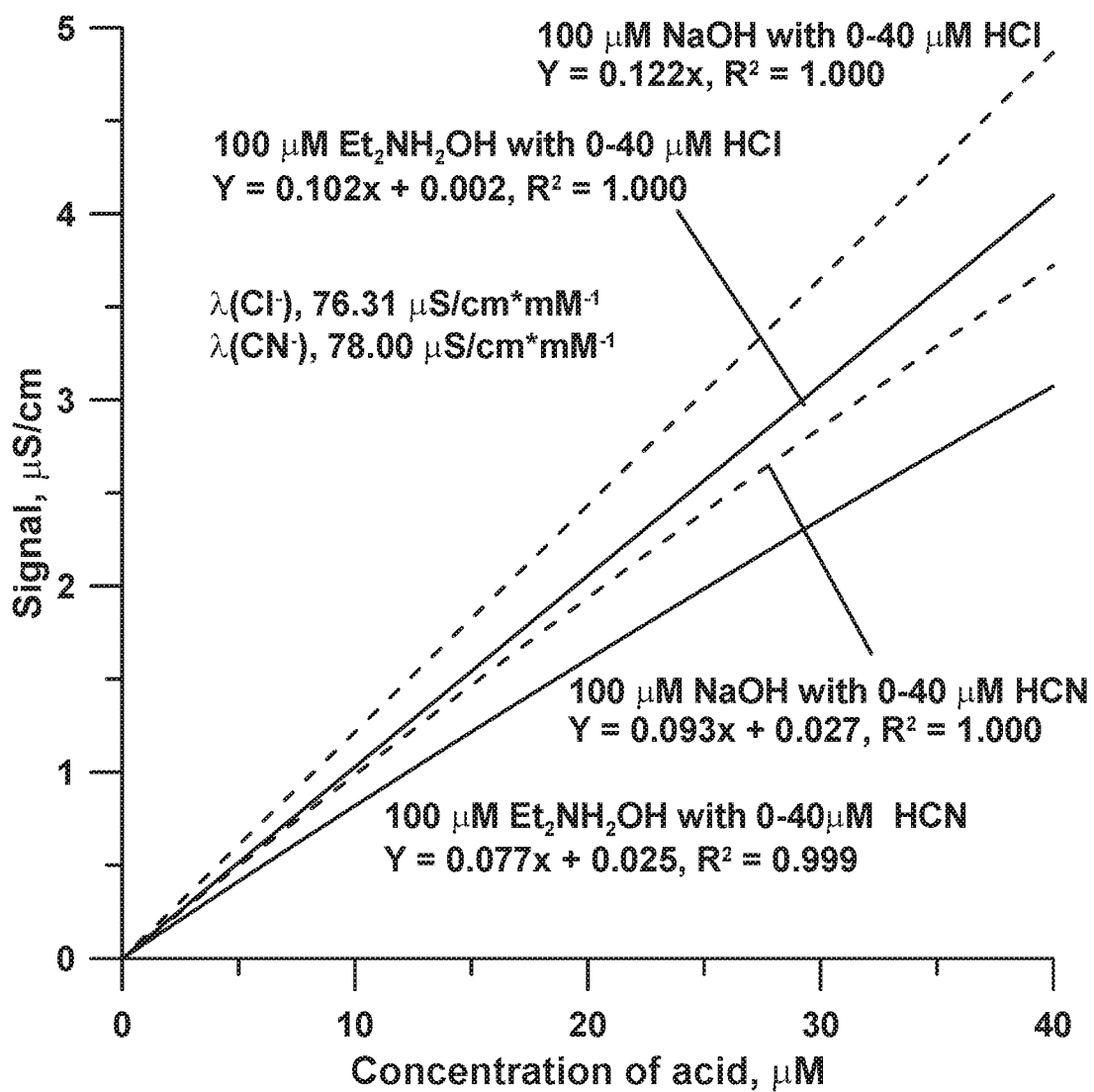
FIG. 2 is a graph illustrating a calculated response of various concentrations of HCl and HCN (pKa 9.31) using 0.1 mM NaOH or 0.1 mM DEA.

The device of the invention functions to allow for detection of salts of weakly ionized analytes. FIG. 21A is a graph showing the response (these are negative signals from baseline) of various concentrations of a very weak acid (HCN). FIG. 21B is a graph showing very strong acid (HCl) responses in a background of 100 µM of a base that varies in basicity from being a strong base (pKb<0) to a base with pKb=5 (close to ammonia, pKb 4.76). FIG. 2 is a graph illustrating a calculated response of various concentrations of HCl and HCN (pKa 9.31) using 0.1 mM NaOH or 0.1 mM DEA.

The systems and methods utilizing the device of the invention are sensitive to the concentration of the analyte salts. FIGS. 18A-18D provide exemplary detector responses for different concentrations (50-150 µM at the peak apex, D2 background 100 µM NaOH) of a monoprotic eluite acid ranging from (a) strong acid to (d) pK=6. The simulated peak profile is modified Gaussian and is assumed to be 60. W-shaped peaks produced from an inadequate background base concentration. Reproduced from Sjögren, A.; Dasgupta. P. K. *Anal. Chem.* 1995, 67, 2110-2118. doi: 10.1021/ac00109a033.

The device, system and methods of the invention also allow the detected analyte salts to be quantified. FIGS. 20A-20C are calibration curves at D1 and D2. (a) Calibration curves at D1; (b), (c) calibration curves at D2. The calibration ranges are from 0.04-4.0 µeq/L for silicate and 0.02-2.0 µeq/L for all other ions. Quantifications of silicate, formate and chloride were achieved using AS24 column, all others on AS 11 column.

The present invention also provides methods of separating and detecting analytes of interest using a system incorporating a device of the invention.

One embodiment of the present invention relates to a method for suppressed ion analysis of an analyte ion or a plurality of different analyte ions in a sample solution. The analyte ions are detected as salts of the analyte ions formed by reaction with a volatile base or volatile acid in the permeant membrane device of the invention. The method includes the following steps: (a) eluting the sample solution with an eluent, comprising electrolyte counterions of opposite charge to the analyte ions, through a separating medium effective to separate the analyte ions to form a separating medium effluent stream, (b) flowing the separating medium effluent stream through a suppression zone in which electrolyte counterions are removed to convert the electrolyte to weakly ionized form to form a suppressor sample effluent stream, (c) converting the analyte ions in the suppressor sample effluent stream into salts in a permeant membrane device by reaction with a volatile base or volatile acid to form an analyte salt stream. Thereafter, the analyte salt is detected.

In an exemplary embodiment, the device of the invention is utilized without the concomitant use of a suppressor. For example, an analyte which is a weakly dissociating acid or weakly dissociating base is separated from other components of a mixture in a chromatographic process and then passed through a device of the invention where the analyte is ionized, and is detected by a detector downstream from the device of the invention. In an exemplary process, the analyte is chromatographed using water, thereby eliminating the need for a suppressor in the system.

Exemplary methods of the invention provide improved detection compared to methods in which the permeant membrane device of the invention is not employed. A representative method produces a signal from the detector greater in magnitude for the salt of the acid or base than a corresponding signal produced for the acid or base in an identical method in the absence of the permeant membrane device.

The device of the invention finds use in chromatographic systems including different types of detectors. In one embodiment, the system of the invention incorporates a detector other than a conductivity detector.

The following examples are intended to further illustrate selected embodiments of the invention and are not to be construed as limiting the scope of the invention.

EXAMPLES

Example 1

Experimental Section

All equipment/components below that are not otherwise specified were from www.thermoscientific.com. An ICS-5000 ion chromatography (IC) with one analytical channel (2-4 mm ϕ columns) and one capillary channel (0.4 mm ϕ columns) was used (FIG. 1). Chromatography was carried out at 35° C. on AG11+AS11 or AG24+AS24 columns (2 mm ϕ), a 2 mm ERS-500 membrane suppressor using a KOH eluent gradient at 0.30 mL/min and 10 µL or 1.0 mL sample volume. Importantly, in some applications the electrodialytic membrane suppressor was turned off for desired periods during the chromatography (vide infra, at the eluent concentration used, the static ion exchange capacity of the suppressor is such that it can maintain suppression for ≥30 min even after turning off). The amine was introduced by the PAID (a Teflon AF® tube immersed in an aqueous DEA solution; see FIG. 7 which is disposed after the first conductivity detector (D1). After the PAID, the capillary scale conductivity detector from the capillary channel was used as the second detector (D2). Because D2 has limited flow capability, a PEEK tee was used to split the PAID effluent. The main portion (80%, 0.24 mL/min) passed through the regenerant channel of a membrane suppressor and then through the continuously regenerated anion trap column (CR-ATC), eventually to waste. The rest (0.06 mL/min) passed through D2 to waste. Data collection (10 Hz) and analysis were performed using Chromeleon v7.1. The post-suppressor eluent composition was characterized both by UV spectrometry with a photodiode array detector (1290 infinity, www.agilent.com) and mass spectrometry with a TSQ Quantum Discovery Max triple-quadrupole mass spectrometer equipped with enhanced mass resolution and heated electrospray ionization probes. The spent suppressor regenerant was characterized by UV spectrometry (Agilent model 8453).

Results and Discussion

Permeative Base Introduction and Choice of the Base

Past efforts on base introduction for weak acid detection has involved strong base. An ionized species cannot be permeatively introduced easily through a gas permeable membrane. An unionized molecule that is volatile can be more easily passed through a gas permeable membrane. Diethylamine (DEA) is a compromise: with a $pK_b$ of 3.0, a significant amount is unionized in aqueous solutions containing percent levels of DEA and it is not especially odorous or toxic. The infinite dilution equivalent conductance of DEAOH (240 $\mu S(cm*mM)^{-1}$) is only marginally lower than that of NaOH (248 $\mu S(cm*mM)^{-1}$). In the concentration range of interest for the present application (0-0.2 mM), NaOH is expected to have a linear concentration—specific conductance relationship; that for DEA ideally follows a quadratic relationship (Sp. Cond, µS/cm=−1.47×10$^{-4}$ C$^2$+0.234 C+0.044, $r^2$=1.0000) but over this limited range, a zero intercept linear fit is also acceptable (Sp. Cond, µS/cm=0.2103 C, $r^2$ 0.9982), FIG. 8), the slope being 15% lower than that of NaOH due to incomplete ionization. The expected signals (peak heights) are readily calculated and are shown in FIG. 2 for both a strong acid analyte HCl and a weak acid analyte HCN ($pK_a$ 9.3) up to peak concentrations of 40 µM (accounting for typical chromatographic dilution, this would correspond to injected concentrations>10 ppm for most ions). Both NaOH and DEA provide linear response but the absolute response was predictably lower by ~20% for DEA than NaOH. Nevertheless, if this loss in sensitivity is made up by lack of dilution and better mixing through permeative introduction, this will be far more attractive than past approaches especially as neither pumps nor electrical means to introduce the base are required.

Relationship of Permeated DEA Concentration

The amount of DEA permeated is expected to be proportional to the concentration of unionized DEA in the external solution. Within the range of interest, the DEA concentration in the external solution is relatively high and much of it is therefore unionized and the unionized concentration is thus linearly related to the total concentration. As a result, the permeated DEA concentration was found to be linearly proportional to the external concentration (FIG. 9). Note that the amount of DEA permeated is so small compared to that externally present, the feed can be used for a very long period. For 125 mL external solution containing 18% DEA at 15° C. and an internal flow rate of 0.3 mL/min, the system will operate for >800 hours before there is a 1% relative decrease in the external concentration. This operational period can be extended even more by buffering the system to have a small amount of strong acid, such that the external total DEA concentration has to be raised even further to maintain the same free [DEA] as before. However, as the operational period needed before refill/concentration adjustment was already very long, this was not explored.

Degradation Products in Electrodialytic Suppression, Characterization of Suppressor Effluents Chemical suppression can provide relatively low noise levels in SCAC and in electrodialytic suppression baseline noise levels can increase with increasing suppressor current beyond a minimal threshold needed for suppression.[viii] Although overall noise levels have decreased by more than two orders of magnitude since these early observations, the same phenomenon can be observed with present electrodialytic suppressors. The exact cause for this noise has never been established. If membrane degradation during electrolysis produces some very weak acids, the temporal variations in their concentrations will produce noise. However being very weak acids, this noise would be greatly magnified after base addition.

Figure 10:
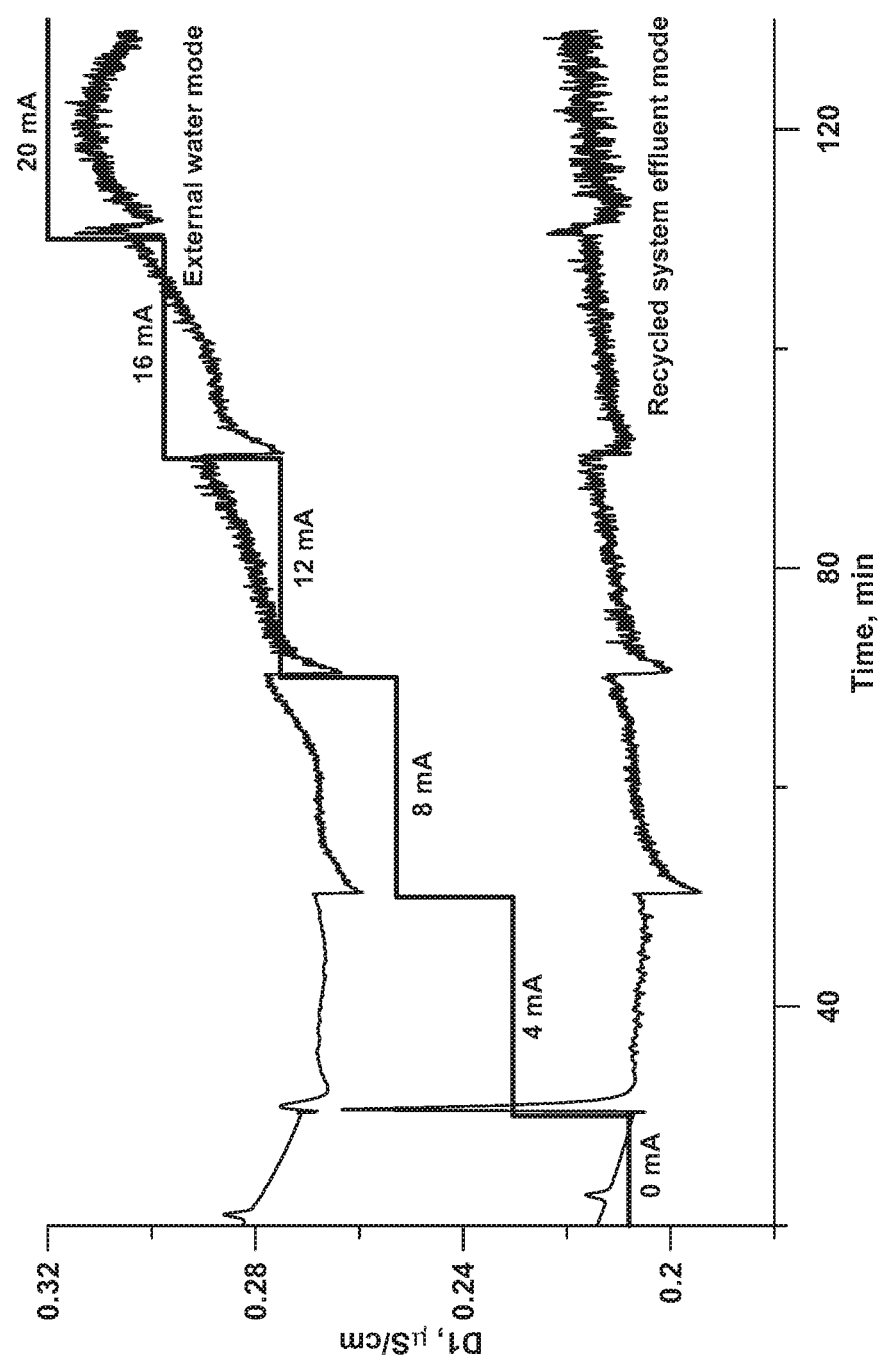
FIG. 10 shows the effect of suppressor current on the baseline conductance of the first detector (D1). The setup is as in FIG. 1. The KOH eluent concentration was kept relatively low at 2.0 mM so that suppressor current was in large excess throughout; 1 mA is sufficient to suppress this eluent. These admittedly exaggerated current conditions allow examination of the causes of systemic noise, which are also present at lower currents, albeit at lower levels. In typical suppressor operation, the current levels are not changed during a gradient run; as such, the current is in substantial excess during much of the run. In the PAID, 18% (v/v) DEA solution was used, resulting in a D2 background of 31 µS/cm. Eluent flow rate 0.30 mL/min; Flow rate through D2 was 20% of the PAID effluent (0.06 mL/min); 80% of the PAID effluent was recycled through the regenerant channel of the suppressor. The current was increased from 0.0 mA to 20 mA with 4 mA steps. Note that the noise is generally lower when the applied current goes towards eluent suppression; it is the excess current that contributes to the noise.
Figure 11:
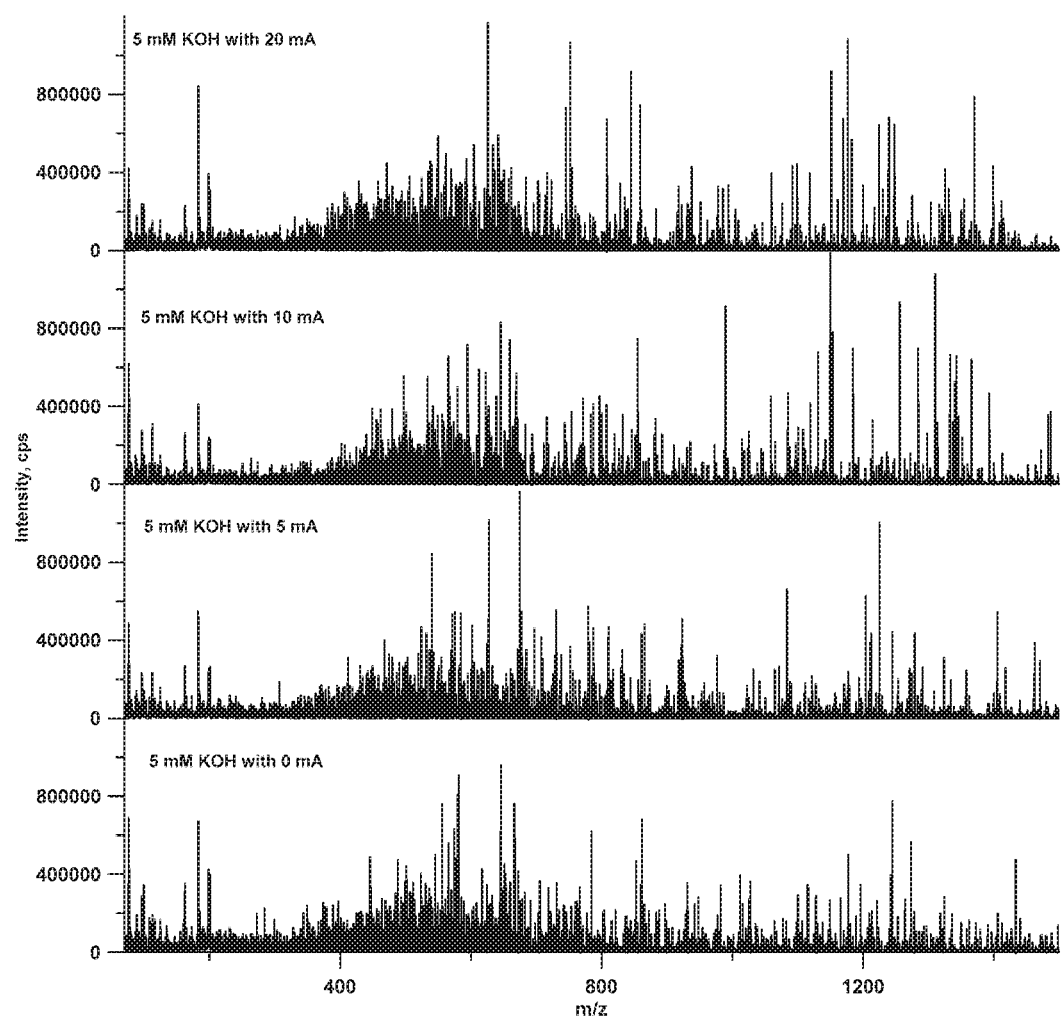
FIG. 11 illustrates negative mode electrospray full range mass spectra at different suppressor current levels; eluent 5 mM KOH at 0.3 mL/min, Suppressor: 2 mm AERS500. 2.5 mA current is sufficient to suppress this amount of eluent. Note that 0 mA indicates that the power to the suppressor was briefly turned off, it continues to suppress for a substantial period from the static ion exchange capacity. In this case, the current is in significant excess only at the two highest current levels and the chemical noise primarily appears in the high m/z ($\geq$1200) region.
Figure 12A:
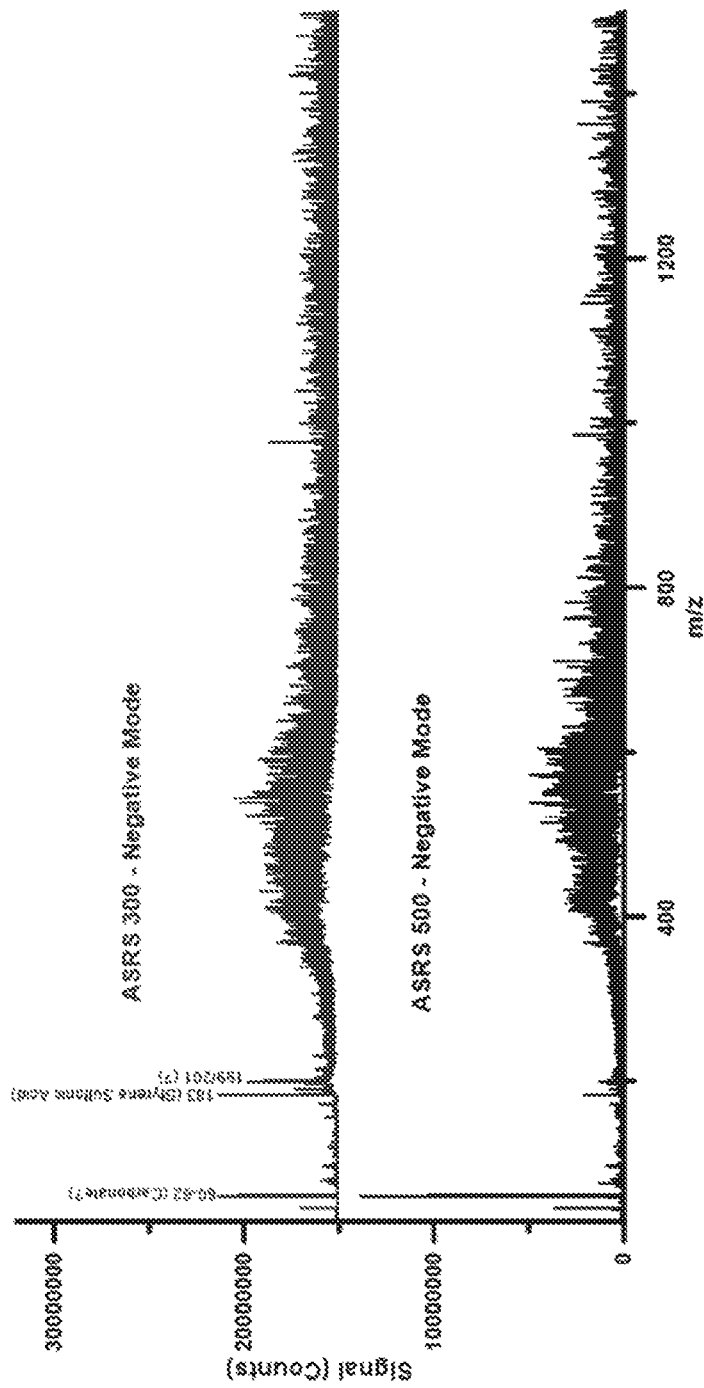
FIG. 12A illustrates negative ion mode ESI-MS scans of two different suppressors. The eluent was 30 mM KOH at 0.3 mL/min with a suppressor current of 50 mA. Spectra were recorded in both negative and positive modes (FIG. 12B) across the full mass range of the spectrometer (30-1500 m/z). The total background for negative ions was much greater than that for positive ions (FIG. 12B) and was comparable between the two suppressors. The monomer ion styrene sulfonate is clearly visible at m/z 183 (confirmed by fragmentation spectra).
Figure 12B:
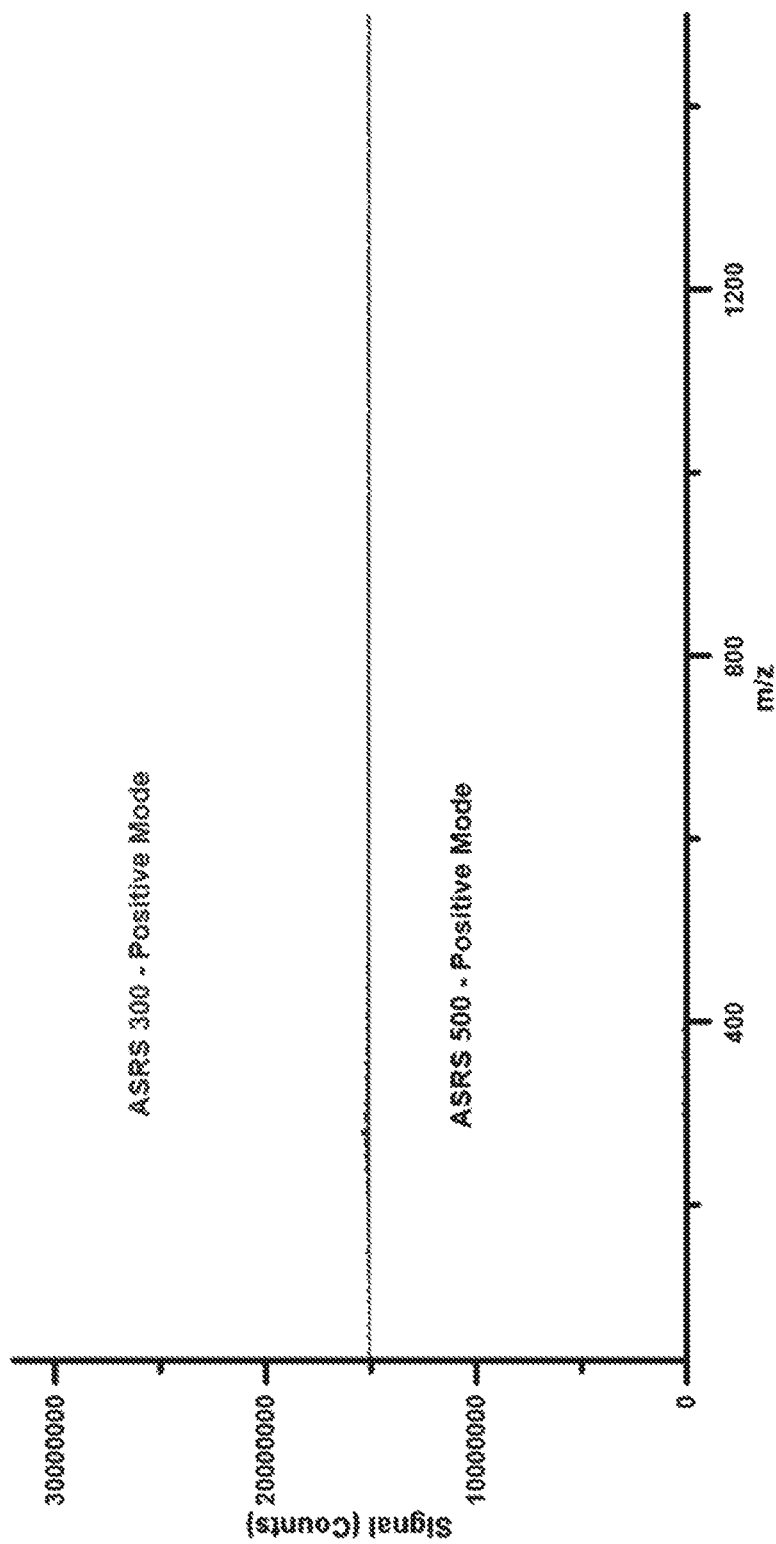
FIG. 12B uses the same scale as was used in the negative ion mode to show the vast difference in background noise. This is not unexpected as the suppressor removes any positively charged interferences from the eluent.
Figure 12C:
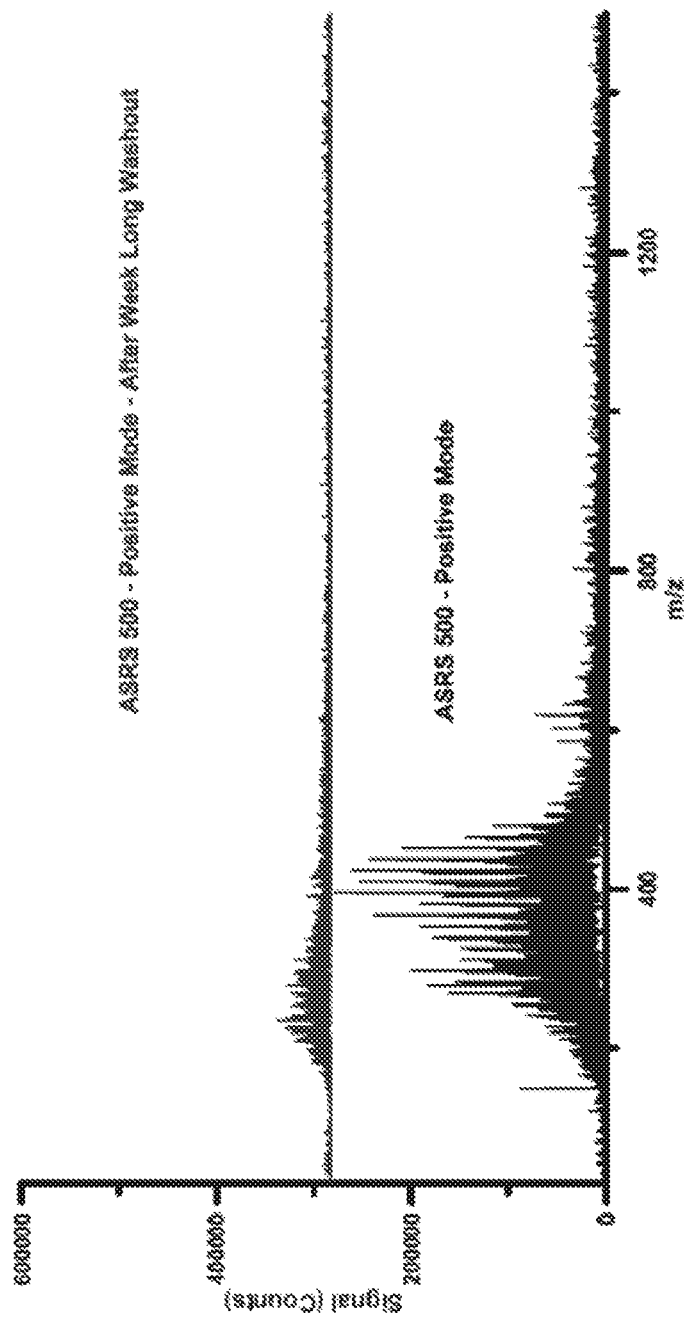
FIG. 12C. A Dionex IS25 pump was connected directly to the ASRS 500 with a restrictor coil ahead of the suppressor which provided ~1200 psi worth of back pressure at 0.5 mL/min. The suppressor was operated in the recycle mode at a current of 50 mA. The suppressor was allowed to continuously operate for approximately 8 days before new background spectra were taken. Note the difference in ordinate scaling between this and previous figures. The washout did help to remove some of the signal especially for the monomer styrene sulfonate, but for the negative mode the background is still incredibly high. There is no analogous noise in the low wavelength UV absorbance trace that can be correlated to the conductance noise (FIG. 13 below shows the 208 nm absorbance trace).

FIG. 10 shows baseline noise generated with large excesses of suppressor current seen in. The noise is more likely from redox degradation of the membrane[ix] than microbubbles.

All observations are consistent with excess suppressor current resulting in higher mass (polymeric/oligomeric) degradation products that are very weakly acidic, resulting in substantially greater noise at D2 after base introduction. If processes at the electrode-membrane interface are responsible for the products that result in the observed noise, looking at the regenerant channel effluent from a suppressor may provide a better insight. Indeed, spectral examination of the regenerant effluent shows that the absorbance in the low UV increases with increasing suppressor current, the absolute values being ~100 times greater compared to those of the central channel effluent (FIG. 15).

In the present setup, some noise can also originate from the possible back penetration/oxidation of DEA present in the liquid that is recycled through the regenerant channels. FIG. 3 does show that the noise was discernibly smaller, especially for D2 if fresh water rather than the PAID effluent was the regenerant.

Figure 13:
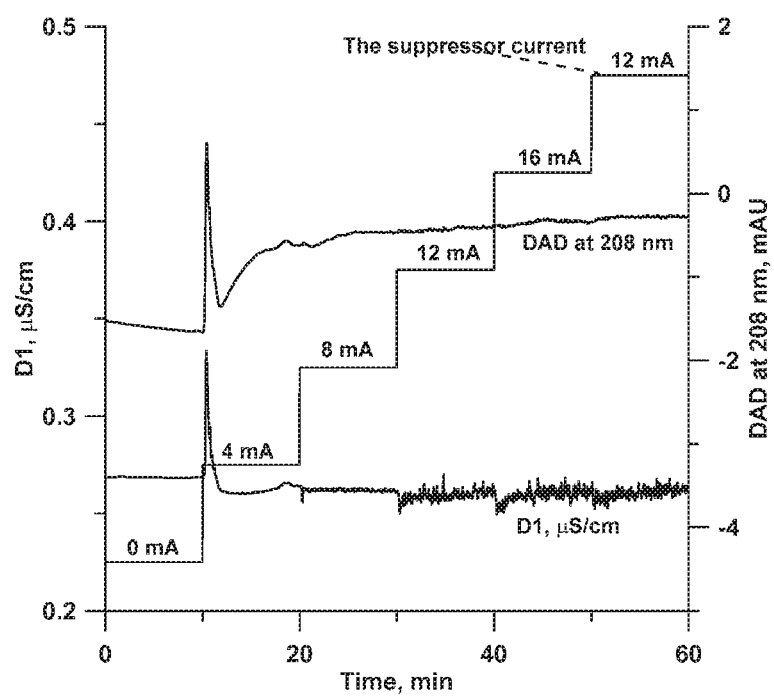
FIG. 13. The effect of the suppressor current on the baseline noise at D1 (2.0 mM KOH @ 0.30 mL/min.) Lower trace, baseline conductivity trace; Upper trace Agilent 1290 diode array absorbance trace at 208 nm. Note that the conductance noise is not reflected in the absorbance data, suggesting that the optically absorbing species is not directly related to the conducting species. In other experiments we have made observations that also suggest this, for example, during a particular current variation experiment, the mean background conductance may decrease while the absorbance increases.

Using Chemical or Intermittent Electrodialytic Suppression vs. Continuous Electrodialytic Suppression Electrodialytic membrane degradation associated noise can obviously be eliminated by using chemical suppression. Most (but not all) electrodialytic suppressors can also be chemically regenerated, especially if the eluent concentration to be suppressed is not particularly high. Intermittent electrodialytic operation basically results in chemical suppression during the time chromatography is conducted. If complete eluent suppression can be maintained, this represents the best of both worlds, at some expense to sample throughput. The present ESRS500 suppressor, has a large enough static (no power applied) ion exchange capacity to completely suppress 10 mM KOH at 0.3 mL/min for 30 min. Turning off power to the suppressor at sample injection and back on after complete separation offers the best baseline noise. It was also possible to turn suppression on or off in specific regions, although there is a shift in baseline and a brief peak/dip (see FIG. 13), the equilibration is rapid and can be practiced if there are no analyte peaks of interest near the peak/dip. Electrolytic suppression also generates oxygen; we have observed serious loss of oxidation-susceptible sulfide with continuous electrodialytic suppression.[8] SCAC could not previously detect such weak acids at trace levels; to take advantage of the newfound ability prevention of such losses appropriate suppression techniques are needed.

Internal Volume, Dispersion, and Baseline Noise

The geometry and internal volume of a device govern band dispersion. Given the same geometry, a larger residence volume typically improves mixing and reduces noise at the expense of greater dispersion. Previously reported performance data in similar efforts, where the smallest dispersion and noise levels were 78±4 μL (25 μL injected sample) and 5±2 nS/cm, is provided. However, in all previous cases a mixing coil or equivalent was used after base introduction and the dispersion induced by this additional device is not taken into account in the above. For the lowest noise case above, the total dispersion, including that produced by the mixing device, was 132±4 μL. The PAID induced dispersion was measured operationally with 10 μL of an 80 μM $HNO_3$ sample injected without column to be 48.8±0.2 μL. In the absence of electrodialytic suppression, there was no statistical difference in baseline noise whether fresh water or the PAID effluent was used for suppressor regeneration, see D2 data in FIG. 3 for 0 mA current), effluent recycling was therefore used. The baseline noise for a background conductance of 30.8 μS/cm in the absence of suppressor current was 4.4±0.6 nS/cm, and notably without the need for a further mixing coil used in many previous studies. Overall this performance is at least equal to or better than previous approaches (see Table 1).[5,6,x]

However, a linear configuration (or a large coil radius) has been reported to be most prone to poor mixing and large dispersion,[xi] hence we coiled the Teflon AF tube in the PAID on a 3.7 mm support rod and thermoset the shape by putting it in boiling water for 30 min. Both the noise, and the dispersion decreased, respectively to 3.6±0.2 nS/cm and 30.3±0.3 μL, under the same test conditions. This improvement was discovered late in the work; other data reported in this paper was obtained without coiling.

Improving Limits of Detection Through Reduced Background (Reduced Added Base Concentration)

Most often baseline noise can be directly correlated with the absolute value of the background.[xii] Reducing the introduced base concentration is thus expected to improve limits of detection (LODs) as the background conductance and hence the background noise will decrease. While a lower base concentration may also limit the upper measurement limit, this is of lesser importance when LOD improvement is the primary goal. Further, upper measurement limits may not have to be sacrificed with lower base concentrations, see below.

The typical dilution factor at the peak apex from sample injection to detection is ~10; so 10 µM base is enough to measure up to 100 µM monoprotic acid HX (amounting e.g., to 3.5 mg/L chloride to 10 mg/L perchlorate), a significant amount for trace analysis. For very weak acids, however, lowering the amount of the base introduced lowers the pH and may decrease the signal because of inadequate ionization. For a strong acid like HCl, with strong base introduction the signal remains constant and independent of base concentration (until the amount of base present is inadequate to neutralize the HCl). With DEA, a weaker base, the signal actually decreases with increasing [DEA] because a buffer is formed. However, as a first approximation if the noise is proportional to the background, the S/N ratio (SNR) increases with [base] being linearly proportional to $[base]^{-1}$ resulting in no difference in SNR between NaOH and DEA introduction. The expected behavior for HCN is qualitatively similar; the 10 µM HCN signal remains almost the same down to 50 µM [base] but decreases steeply thereafter due to incomplete ionization. The overall gain in SNR with decreasing [base] is less steep than with HCl but here also SNR increases consistently with decreasing [base]. In going from 200 to 10 µM DEA, the SNR gain for 10 µM HCl and HCN are 21.7 and 6.8×, respectively. Also importantly, no discernible difference in SNR is predicted for a weak acid like HCN between NaOH vs. DEA introduction.

However; there may be noise sources other than that related to the background, so the noise may stop decreasing linearly with the background conductance. Further, the computations ignore the unavoidable intrusion of $CO_2$. FIG. 4 shows the dual detection chromatograms of a sample containing a variety of anions; the D2 trace is shown for two different [DEA] values. Predictably, zwitterionic taurine and very weak acid anions silicate/sulfide/cyanide produce negligible or nonexistent responses at D1 but good responses at D2. The D2 responses for 27 µM vs. 150 µM [DEA] backgrounds follow the theoretically predicted behavior. Strong acid signals increase at lower [DEA] but those for the very weak acids decrease with decreasing [DEA]. The 5.6× decrease in [DEA] from 150 to 27 µM was almost exactly reflected in a 5.4× decrease in noise from 4.4 to 0.83 nS/cm. As a result, despite a decrease in the response at lower [DEA], the LODs still improve for the very weak acids. FIGS. 16A-16D depict very good linear calibration curves for all injected ions present in FIG. 4 over a 2-200 µM range. FIGS. 17A and 17B respectively summarize the improvements in the LOD and the changes in sensitivity (calibration slope) for each ion as [DEA] is decreased from 150 to 27 µM; all the LODs decreased, sensitivity improved for all but 3. LODs are listed in Table 2, sub-µM LODs for the very weak acid analytes have never previously been attained with conductometric detection.

Quantitation at the Second Detector at High Analyte Concentrations

At high analyte concentrations, the peak eluite acid concentration can exceed the introduced base concentration. While obviously such a sample can be diluted and reinjected, good quantitation is actually possible from the extant response. For a strong acid analyte, it is intuitive that in such cases, the response will be a W-shaped peak, the signal decreases initially and reaches a minimum when all the base is neutralized and then starts rising again as excess acid is added (see FIG. 18). Depending on the extent of the acid excess and its pKa, the center of the W-peak may exceed the original base line. It is intuitive that the width of a peak at any given height (not a fraction of the peak maximum but at a fixed ordinate value) must be a function of the analyte concentration. For a Gaussian peak of standard deviation s, amplitude A, it is readily derived that the width $W_h$ at any height h is given by:

$$W_h = 2s(2 \ln A/h)^{0.5} \qquad (1)$$

Similar relationships hold for virtually any chromatographic peak shape except the exponent 0.5 differs. The peaks can be quantitated thus based on width, as long as h is chosen before any abnormality in detector response (saturation due to inadequate [base], detector saturation/nonlinearity etc.) occurs, as illustrated in the top left quadrant of FIG. 18. The key point presently is that quantitation can continue to be done long after the added base is fully neutralized. As width can be measured with high temporal resolution with fast data acquisition systems used today, adding only a small amount of base is sufficient for the present and similar systems.

An Important PAID Application. Determination of Silicate

Silicon is among the most abundant crustal elements; all natural water contains some dissolved silica. The silica content in natural water is typically in the range of 100-500 µM (2.8-14 mg/L Si).[xiii] The American Society for Testing and Materials specifies the maximum silica levels for Type 1, Type 2, and Type 3 Reagent Grade Water as 50 nM, 50 nM, and 8.3 µM, respectively.[xiv] Dissolved silica is problematic in many areas. In power plant boiler feed water it corrodes the heating equipment and turbines and reduces turbine efficiency.[xv] Measurements at the lower nM levels are needed in the semiconductor industry as submicromolar levels can still affect surface reactions on silicon wafers[xvi] and low levels of dissolved silica are not detectable by conductivity or carbon measuring instruments. Silicate is also an essential aquatic macronutrient. Of many methods to measure silicate,[xvii] reactions with molybdenum salts in acidic media to form yellow silicomolybdic heteropolyacid or its reduction product heteropoly blue[xviii,xix] and their spectrophotometric measurement are the most common. This is satisfactory for some samples[xx] but not when traces must be measured and/or the matrix is complex. The first application of ion exclusion chromatography (ICE) and/or inductively coupled plasma mass spectrometry (ICP-MS) to silicate/silicon determination[xxi] attained a limit of detection (LOD) of 80 nM; this remains the best reported LOD by ICP-MS. Interestingly, these authors report a lower silicon blank signal for a quartz torch than an alumina torch. In any case, this approach is capital intensive, requires a skilled operator and still cannot meet the needs of the semiconductor industry. Li and Chen[xxii] reported ICE separation and conductometric detection of silicate with only water as eluent with an LOD of 20 nM. Unfortunately this report is not credible. While it has been cited 33 times, no attempts have obviously been made to replicate the results. After failing to replicate the results, we realized that this approach can be shown ab initio to fall orders of magnitude short of the claimed LOD.

The present method is sensitive enough to readily determine the gradual appearance of silicate in initially pure water kept in a glass vial even in acidic conditions, as shown in FIG. 5. As may be anticipated, silicate continues to increase in concentration, essentially linearly, in a basic solution. Interestingly, the initial appearance of silicate in pure water is even more rapid (this observation is reproducible).

Albeit more sensitive than previously reported methods, the above silicate LOD of 1.0 µM is still inadequate for testing compliance in Type I reagent water. Large volume sample injection was therefore investigated to meet this goal. While good dual detection chromatograms were obtained with the AG11-AS11 columns used (FIG. 19), we found that exposures of the sample/water to our laboratory environment results in contamination with traces of formate that co-elutes with silicate under these conditions. A more robust approach was realized with an AG24-AS24 column set which has an altogether different selectivity. Using the same KOH gradient, silicate was the first to elute and well separated from all other anions (FIG. 6). The LOD of silicate thus achieved was 21 nM based on the S/N=3 criterion, sufficient to determine compliance to Type 1 reagent water specifications. A 1 mL injection volume also permits 3, 3, and 13 nM LODs for taurine, sulfide, and cyanide, respectively. We wish to note that the separation in FIG. 6 was not optimized for the separation of silicate, which actually elutes here with poor efficiency. Doubtless, in many samples the composition will permit an earlier elution with a steeper gradient as a much sharper peak, thus improving LOD further. The calibration curves of different analytes under the present elution conditions are shown in FIGS. 20A-20C.

The PAID is a robust low-dispersion, low-noise device that brings remarkable simplicity and ease of use to dual conductometric detection to improve detectability of weakly ionized analytes. The ability to measure low levels of silicate is an attribute that can be particularly useful. Although not exemplified here, it is apparent that acids can be introduced just as easily for the detection of very weak bases, e.g., various amines.

Example 2

Construction of PAID

A 60 cm length of Teflon AF tube (0.28 mm i.d.×0.68 mm o.d., www.biogeneral.com) was used for gaseous amine penetration as shown in FIG. 7. Each end was inserted into a polytetrafluoroethylene (PTFE) tube sleeve (25 mm×0.71 mm i.d.) and sealed by standard compression fittings to a PEEK union (10-32 thread, 0.25 mm bore). The other end of the union was connected to a PEEK tubing (0.25 mm i.d.), which was inserted through a silicon stopper sealed tightly on a 125 mL Erlenmeyer flask. The flask contained 100 mL 3.0-18% (v/v) DEA solution. The suppressor and the PAID were both maintained in an enclosure at 15° C.

Dispersion Measurement

To measure the dispersion due to the PAID, the device was put before D1, with DEA on the outside. Dispersion was measured as the square root of the difference between the square of the band volumes $((W^2-W'^2)^{1/2}$, where W and W' are the band volumes with and without the PAID being present, respectively (see *Anal. Chem.* 1984, 56, 103-105).

It is understood that the examples and embodiments described herein are for illustrative purposes only and that various modifications or changes in light thereof will be suggested to persons skilled in the art and are to be included within the spirit and purview of this application and scope of the appended claims. All publications, sequence accession numbers, patents, and patent applications cited herein are hereby incorporated by reference in their entirety for all purposes.

TABLE 1

Dispersion Volume and Baseline Noise in Current and Previous Studies.

| Experimental conditions | Dispersion volume | Noise level | Mixer Present | Reference |
| --- | --- | --- | --- | --- |
| 25 µL injection, flow rate 1.0 mL/min, chloride sample injected with column and suppressor; Electrodialytic base introduction | Band dispersion is for the base introduction device only; does not include that induced by the mixer. Band dispersion increases for all electrodialytic devices when it is actually operating (power is applied) 67 ± 4 µL power off; 94 ± 6 µL power on, device in actual operation. | 20-25 nS/cm in a specific conductance background of ~25 µS/cm; 20 minutes period of baseline recording; | Commercial in-line passive mixer used after base introduction device | 5 |
| 25 µL injection, flow rate 1.0 mL/min, 0.15 mM chloride sample injected with column and suppressor; Electrodialytic base introduction using planar devices of various length and a tubular device. | All data below in power on condition and does not include dispersion induced by subsequent mixer. 8 cm planar, 89.2 ± 1.8 µL 4 cm Planar, 86.7 ± 3.3 µL 2 cm Planar, 78.1 ± 5.2 µL Tubular, 90.0 ± 3.4 µL Pump 2 had lower flow noise than pump 1. | 8 cm planar, 17.2 nS/cm; Pump 1 4 cm Planar, 15.4 nS/cm, Pump 1 2 cm Planar, 34.3 nS/cm, Pump 1 2 cm Planar, 7.7 nS/cm, Pump 2 Tubular, 19.7 nS/cm, Pump 2 All in a specific conductance background of ~25 µS/cm; 8.3 minutes period of baseline recording; | Homemade knitted mixing coil used after base introduction device | 6 |
| 25 µL injection, flow rate 1.0 mL/min, 0.25 mM acetate sample injected with column and suppressor; Reports on both passive and electrodialytic base introduction | Planar, 96 ± 8 µL Tubular, 110 ± 4 µL Filament-filled annular helical (FFAH) design, passive introduction, 78 ± 4 µL Dispersion from subsequent mixer was measured as 55 µL. So, the total dispersion volume in the most favorable case was 132 ± 4 µL. | Planar sheet membrane design, 7 ± 2 nS/cm Straight tube in shell design, 7 ± 2 nS/cm FFAH, 5 ± 2 nS/cm All in a specific conductance background of ~2.8 µS/cm; 15 minutes period of baseline recording; | 0.75 mm φ, 750-mm long mixing coil woven in serpentine II design, calculated internal volume ~330 µL. | 11 |

TABLE 1-continued

Dispersion Volume and Baseline Noise in Current and Previous Studies.

| Experimental conditions | Dispersion volume | Noise level | Mixer Present | Reference |
|---|---|---|---|---|
| 10 μL injection, flow rate 0.3 mL/min, 80 μM HNO₃ sample injected without column and suppressor; Permeative base introduction | 48.8 ± 0.2 μL as large diameter coil 30.3 ± 0.3 μL as a 4 mm diameter coil | 4.4 ± 0.6 nS/cm for large diameter coil 3.6 ± 0.2 nS/cm for a 4 mm diameter coil. All in a specific conductance background of ~31 μS/cm; 2.5 minutes period of baseline recording; | No additional mixer used The internal volume of the Teflon AF tube was 37 μL: including connecting tubes the volume was 50.7 μL. | This work |

TABLE 2

Limit of detection (LOD) at D 1 and D 2.[a]

| Analytes | LOD at D 1 (10 μL injection), nM | LOD at D 1 (1.0 mL injection), nM | LOD at D 2 using 150 μM DEA-OH (10 μL injection), μM | LOD at D 2 using 27 μM DEA (10 μL injection), μM | LOD at D 2 using 27 μM DEA (1.0 mL injection), nM |
|---|---|---|---|---|---|
| Fluoride | 3.47 | 0.05 | 1.20 | 0.18 | 2.26 |
| Taurine | 72.27 | 0.94 | 1.14 | 0.27 | 2.61 |
| Propionate[b] | 5.56 | NA | 1.36 | 0.20 | NA |
| Silicate | NA | NA | 2.25 | 1.00 | 21.32 |
| Pyruvate | 9.35 | 0.12 | 2.30 | 0.38 | 4.51 |
| Chloroacetate | 3.80 | 0.04 | 1.04 | 0.18 | 1.68 |
| Sulfide | 29.83 | 0.32 | 1.91 | 0.35 | 2.79 |
| Cyanide | NA | NA | 2.66 | 0.80 | 13.06 |
| Trifluoroacetate | 4.40 | 0.05 | 1.30 | 0.20 | 2.10 |
| Formate | NA | 0.04 | NA | NA | 2.51 |
| Chloride | NA | 0.03 | NA | NA | 2.63 |
| Nitrate | 3.66 | 0.04 | 1.59 | 0.24 | 2.78 |
| Sulfate | 1.77 | 0.03 | 0.94 | 0.16 | 1.05 |
| Oxalate | 2.24 | 0.05 | 0.95 | 0.15 | 1.70 |

[a]The calibration ranges were from 10-200 μeq/L with 150 μM DEA introduction and 2-200 μeq/L with 27 μM DEA introduction. The calibration ranges were from 0.04-4.0 μeq/L for silicate and 0.02-2.0 μeq/L for all other ions with 1.0 mL sample injection.
[b]Propionate was not added for 1 mL sample injection, due to some coelution with silicate.
[c] LOD of silicate (as well as formate and chloride) with 1 mL sample size was calculated using AS24 column.

[i] Vanatta, L. E. *TrAC, Trends Anal. Chem.* 2001, 20, 336-345.
[ii] Michalski, R. *Mini-Rev Med. Chem.* 2014, 14, 862-872.
[iii] Karu, N.; Dicinoski, G. W.; Haddad, P. R. *TrAC, Trends Anal. Chem.* 2012, 40, 119-132.
[iv] Berglund, 1.; Dasgupta, P. K.; Lopez, J. L.; Nara, O. *Anal. Chem.* 1993, 65, 1192-1198.
[v] Sjögren, A.; Dasgupta, P. K. *Anal. Chim. Acta* 1999, 384, 135-141.
[vi] Liao, H.; Dasgupta, P. K.; Srinivasan, K.; Liu, Y. *Anal. Chem.* 2015, 87, 793-800.
[vii] Liao, H.; Kadjo, A. F.; Dasgupta, P. K. *Anal. Chem.* 2015, 87, 8342-8346.
[viii] Liu., Y.; Srinivasan, K.; Pohl, C.; Avdalovic, N. *J. Biochem. Biophys. Methods* 2004, 60, 205-232.
[ix] Strong, D. L.; Dasgupta, P. K. *Anal. Chem.* 1989, 61, 939-945.
[x] Al-Horr, R.; Dasgupta, R.; Adams, R. L. *Anal. Chem.* 2001, 73, 4694-4703.
[xi] Waiz, S.; Cedillo, B. M.; Jambunathan, S.; Hohnholt, S. G.; Dasgupta, P. K.; Wolcott, D. W. *Anal. Chim. Acta* 2001, 428, 163-171.
[xii] Small, H. *Ion Chromatography* Plenum, New York, 1989, pp. 139-148.
[xiii] Zini, Q.; Buldini, P. L.; Morettini, L. *Microchem. J.* 1985, 32, 148-152.
[xiv] American Society for Testing and Materials. Standard Specification of Reagent Water. ASTM D1193-06 (Reapproved 2011). www.astm.org/Standards/D1193.htm.
[xv] Li, Y; Muo, Y.; Xie, H. *Anal. Chim. Acta* 2002, 455, 315-325.
[xvi] Sabarudin, A.; Oshima, M.; Ishii, N.; Motomizu, S. *Talanta* 2003, 60, 1277-1285.
[xvii] Ma, J.; Adornato, L.; Byrne, R. H.; Yuan, D. *TrAC, Trends Anal. Chem.* 2014, 60, 1-15.
[xviii] Amornthammarong, N.; Zhang, J. *Talanta* 2009, 79, 621-626.
[xix] Rimmelin-Maury, P.; Moutin, T.; Queguiner, B. *Anal. Chim. Acta* 2007, 587, 281-286.
[xx] Ma, J.; Byrne, R. H. *Talanta* 2012, 88, 484-489.
[xxi] Hioki, A.; Lain, J. W. H.; Mclaren, J. W. *Anal Chem.* 1997, 69, 21-24.
[xxii] Li, H.; Chen, F. *J. Chromatogr. A* 2000, 874, 143-147.

The invention claimed is:
1. A device comprising:
(a) an impermeable component defining an internal compartment, comprising;
(i) at least one of a first acid and a first base introduction section fluidically connected with at least one of a first respective weakly dissociating acid and weakly dissociating base extraction section, wherein the at least one of the first acid and the first base introduc- tion section comprises at least one of a first respective acid and a first base inlet port and at least one of a second respective acid and a second base waste outlet port; and
  (ii) the at least one of the first respective weakly dissociating acid and the first weakly dissociating base extraction section comprises a water introduction port and at least one of a respective weakly dissociating acid and weakly dissociating base waste outlet port; and
(b) a permeable membrane disposed within a cavity of the internal compartment, wherein the permeable membrane is contiguous with the at least one of the first acid and a first base introduction section and the at least one of the first respective weakly dissociating acid and the first weakly dissociating base extraction section, wherein the permeable membrane is in a tubular configuration having a lumen and is in contact with at least one of a volatile base or acid on an outside of the permeable membrane to only allow passage of an at least one of a volatile acid or a volatile base through the permeable membrane and into the lumen of the permeable membrane;
wherein the device is configured to receive an effluent from a chromatographic medium containing a weakly dissociating acid or a weakly dissociating base such that the weakly dissociating acid or the weakly dissociating base flows in fluidic contact within the lumen of the permeable membrane, and further wherein the permeable membrane is amorphous fluoroplastic, which is gas permeable and liquid impermeable.

2. The device of claim 1, wherein the volatile acid or volatile base is a volatile amine.

3. The device of claim 1, wherein the impermeable component and the permeable membrane are spaced apart from each other to facilitate fluid flow between an outer surface of the permeable membrane and an inner surface of the impermeable component.

4. The device of claim 1, wherein at least one weakly dissociating acid extraction section or weakly dissociating base extraction section is fluidly connected to a detector.

5. A method comprising:
(a) introducing a volatile acid or a volatile base to an acid or base introduction section of a permeable membrane device via an acid or base introduction port, wherein the permeable membrane device is configured for integration downstream of a chromatographic medium of an ion chromatographic separation,
(b) permeating the membrane with the volatile acid or volatile base and contacting a weakly dissociating acid or base within an internal compartment of the membrane of the device;
(c) traversing the weakly dissociating acids or bases along a length of the acid or base introduction section to enter a weak acid or base extraction section of the device;
(d) introducing deionized water into the weak acid or base extraction section of the device, via a water introduction port; and
(e) contacting a surface of the membrane of the device with the deionized water, thereby extracting protonated weakly dissociating acid or deprotonated weakly dissociating base and carrying the protonated weakly dissociating acid or deprotonated weakly dissociating base out of the permeable membrane device and to a detector;
wherein the permeable membrane device comprises:
  (i) an impermeable component defining the internal compartment comprising the acid or base introduction section contiguous and fluidically connected with the weak acid or base extraction section, the acid or base introduction section comprising an acid or base inlet port and a respective acid or base waste outlet port, and the weak acid or base extraction section comprising the water introduction port and a respective weakly dissociating acid or weakly dissociating base waster outlet port, and
  (ii) the permeable membrane, wherein the permeable membrane is amorphous fluoroplastic, which is gas permeable and liquid impermeable.

6. The device of claim 5, wherein the volatile acid or volatile base is a volatile amine.

* * * * *